(12) United States Patent
Liang et al.

(10) Patent No.: US 11,327,233 B2
(45) Date of Patent: May 10, 2022

(54) ENCODING APPARATUS USING SAME POLARIZATION MODES, AND QUANTUM KEY DISTRIBUTION DEVICE AND SYSTEM BASED ON SAME

(71) Applicant: Huawei Technologies Co., Ltd., Shenzhen (CN)

(72) Inventors: Wenye Liang, Shenzhen (CN); Changzheng Su, Shenzhen (CN); Xinhua Xiao, Shenzhen (CN); Zhifang Fang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 653 days.

(21) Appl. No.: 16/364,512

(22) Filed: Mar. 26, 2019

(65) Prior Publication Data

US 2019/0222416 A1 Jul. 18, 2019

Related U.S. Application Data

(63) Continuation of application No. PCT/CN2017/103058, filed on Sep. 23, 2017.

(30) Foreign Application Priority Data

Sep. 27, 2016 (CN) .......................... 201610856277.3

(51) Int. Cl.
*G02B 6/27* (2006.01)
*G02F 1/09* (2006.01)
(Continued)

(52) U.S. Cl.
CPC ......... *G02B 6/2766* (2013.01); *G02B 6/2746* (2013.01); *G02F 1/093* (2013.01);
(Continued)

(58) Field of Classification Search
CPC ..... G02B 6/2766; G02B 6/2746; G02F 1/093; H04B 10/70; H04L 9/08; H04L 9/0858; H04L 9/0852
See application file for complete search history.

(56) References Cited

U.S. PATENT DOCUMENTS 4,902,888 A * 2/1990 Kondo .................. G01D 5/266
250/225
5,986,815 A * 11/1999 Bryars ................ G02B 27/145
348/E9.027
(Continued)

FOREIGN PATENT DOCUMENTS

CN 1651947 A 8/2005
CN 1237368 C 1/2006
(Continued)

OTHER PUBLICATIONS

Stucki, D. et.al., "Quantum key distribution over 67 km with a plug and play system," New Journal of Physics 4 (2002) 41.1-41.8, Jul. 12, 2002, 9 pages.

*Primary Examiner* — Andrew Jordan
(74) *Attorney, Agent, or Firm* — Slater Matsil, LLP

(57) ABSTRACT

The present invention discloses an encoding apparatus, including: a polarization splitter-rotator PSR, a polarization rotation structure, and a modulator, where the PSR is configured to receive an input signal light, split the input signal light into two parts whose polarization modes are the same, and send the two parts to the polarization rotation structure and the modulator respectively; the polarization rotation structure has functions of rotating, by 180 degrees, a polarization direction of an optical signal entering the polarization rotation structure from one end, and keeping a polarization direction of an optical signal entering the polarization rotation structure from the other end unchanged; the modulator is configured to modulate a light (Continued)

input to the modulator; and the PSR is further configured to receive signal lights sent by the polarization rotation structure and the modulator, combine the two signal lights to send the output signal light.

20 Claims, 10 Drawing Sheets

(51) Int. Cl.
*H04L 9/08* (2006.01)
*H04B 10/70* (2013.01)

(52) U.S. Cl.
CPC ............... *H04B 10/70* (2013.01); *H04L 9/08* (2013.01); *H04L 9/0858* (2013.01)

(56) References Cited

U.S. PATENT DOCUMENTS

| | | | |
|---|---|---|---|
| 6,188,768 B1 | 2/2001 | Bethune et al. | |
| 6,845,117 B2* | 1/2005 | Wakisaka | H01S 5/12 372/46.01 |
| 7,221,452 B2* | 5/2007 | Berger | G01J 3/12 356/327 |
| 7,917,031 B2* | 3/2011 | Boffi | H04J 14/06 398/65 |
| 8,200,087 B2* | 6/2012 | Boffi | H04J 14/02 398/65 |
| 8,358,466 B2* | 1/2013 | Cai | G02B 27/283 359/489.08 |
| 2003/0086174 A1* | 5/2003 | Wakisaka | H01S 5/12 359/566 |
| 2004/0005056 A1 | 1/2004 | Nishioka et al. | |
| 2004/0125374 A1* | 7/2004 | Berger | G01J 3/18 356/364 |
| 2007/0110242 A1 | 5/2007 | Tomita et al. | |
| 2007/0280689 A1* | 12/2007 | Boffi | H04J 14/02 398/65 |
| 2008/0037998 A1 | 2/2008 | Zhengfu et al. | |
| 2009/0185689 A1 | 7/2009 | Beal | |
| 2011/0170870 A1* | 7/2011 | Boffi | H04J 14/06 398/65 |
| 2013/0107274 A1* | 5/2013 | Vertikov | G01B 9/02045 356/479 |
| 2019/0222416 A1* | 7/2019 | Liang | G02B 6/2746 |

FOREIGN PATENT DOCUMENTS

| | | |
|---|---|---|
| CN | 101150371 A | 3/2008 |
| CN | 101571612 B | 12/2012 |
| CN | 104579641 A | 4/2015 |
| CN | 105680955 A | 6/2016 |
| CN | 105897413 A | 8/2016 |
| CN | 105897414 A | 8/2016 |
| JP | 2006041907 A | 2/2006 |
| WO | 2005053219 A1 | 6/2005 |
| WO | 2007066978 A1 | 6/2007 |

* cited by examiner

ENCODING APPARATUS USING SAME POLARIZATION MODES, AND QUANTUM KEY DISTRIBUTION DEVICE AND SYSTEM BASED ON SAME

CROSS-REFERENCE TO RELATED APPLICATIONS

This application is a continuation of International Application No. PCT/CN2017/103058, filed on Sep. 23, 2017, which claims priority to Chinese Patent Application No. 201610856277.3, filed on Sep. 27, 2016. The disclosures of the aforementioned applications are hereby incorporated by reference in their entireties.

TECHNICAL FIELD

The present invention relates to the field of optical communications, and in particular, to an encoding apparatus, and a quantum key distribution (QKD) device and system based on same.

BACKGROUND

Quantum communication is a communications technology developed based on the classical information theory and quantum mechanics. Currently, a practical quantum communications technology is mainly quantum key distribution (QKD). Security of a key depends on basic principles of quantum mechanics, such as the measurement collapse theory, no-cloning theorem, and the uncertainty principle. Therefore, it is theoretically proved that keys allocated to two communication parties by using a QKD system are secure, and QKD has a broad application prospect in the fields of military, national defense, information security, and the like.

In an existing QKD system shown in FIG. 1, a quantum light source is located at a transmit end (Alice end), and is used to generate an optical pulse. The optical pulse is divided into two optical pulses P1 and P2 by using a beam splitter. P1 passes through a short arm, and P2 passes through a long arm. After passing through a Faraday rotator mirror (FRM), P1 returns to the beam splitter. After passing through a modulator and an FRM, P2 returns to the beam splitter. After passing through an attenuator sequentially and being attenuated to a single-photon level, the two optical pulses P1 and P2 are sent to a receive end (Bob end) by using a quantum channel. When passing through the modulator, P2 is modulated with information about the Alice end added.

At the Bob end, P1 and P2 are received by a circulator sequentially, and are sent to a beam splitter at the Bob end. The optical pulse P1 is divided into P11 and P12, and the optical pulse P2 is divided into P20 and P22. P11 and P20 pass through a short arm, and P12 and P22 pass through a long arm. After passing through an FRM, P11 and P20 return to the beam splitter. After passing through a modulator and an FRM and being modulated with information about the Bob end added, P12 and P22 return to the beam splitter. Because an optical path difference between the long arm and the short arm of the Bob end is equal to an optical path difference between the long arm and the short arm of the Alice end, P12 and P20 arrive at the beam splitter at the same time and interfere with each other in the beam splitter, and interference signals are obtained by two single-photon detectors D1 and D2. A quantum key can be obtained by processing detection results of the two single-photon detectors according to a corresponding quantum key distribution protocol.

However, in the existing QKD system, modulated optical pulses (for example, P2 at the Alice end and P12 at the Bob end) all need to first pass through the modulator once; and after polarization directions of the modulated optical pulses are rotated by the FRM by 90 degrees, the rotated optical pulses pass through the modulator once again. All high-rate modulators are polarization-dependent. For example, usually, an insertion loss for a TE polarized light is 6 dB, and an insertion loss for a TM polarized light is 30 dB, which is equivalent to that an optical pulse is attenuated by 36 dB after a round trip. The attenuation is too large. Therefore, the existing QKD system can use only a low-rate modulator, and high-speed communication requirements cannot be met.

SUMMARY

An objective of the present invention is to provide an encoding apparatus. The encoding apparatus can replace an FRM and a modulator in an existing QKD system, so as to resolve problems that the existing QKD system can use only a low-rate modulator and high-speed communication requirements cannot be met.

According to a first aspect, an encoding apparatus is provided, including a polarization splitter-rotator PSR, a polarization rotation structure, and a modulator, where the PSR has three ports, receives an input signal light by using a first port of the PSR, splits the input signal light into a first polarized light and a second polarized light, sends the first polarized light to the polarization rotation structure by using a second port of the PSR, and sends the second polarized light to the modulator by using a third port of the PSR, where a polarization mode of the first polarized light is the same as a polarization mode of the second polarized light; the polarization rotation structure is configured to rotate a polarization direction of the first polarized light by 180 degrees to obtain a rotated first polarized light, and send the rotated first polarized light to the modulator; the modulator is configured to modulate the rotated first polarized light to obtain a first signal light, and send the first signal light to the third port of the PSR; and is further configured to modulate the second polarized light to obtain a second signal light, and send the second signal light to the polarization rotation structure; the polarization rotation structure is further configured to send the second signal light to the second port of the PSR; and the PSR is further configured to combine the first signal light and the second signal light to obtain an output signal light, and send the output signal light by using the first port of the PSR, where a polarization direction of the output signal light is perpendicular to a polarization direction of the input signal light.

According to a second aspect, an optical reflector is provided, including a PSR and a polarization rotation structure, where the PSR has three ports, receives an input signal light by using a first port of the PSR, splits the input signal light into a first polarized light and a second polarized light, and sends the first polarized light and the second polarized light to the polarization rotation structure by using a second port of the PSR and a third port of the PSR respectively, where a polarization mode of the first polarized light is the same as a polarization mode of the second polarized light; the polarization rotation structure is configured to: rotate a polarization direction of the first polarized light by 180 degrees to obtain a rotated first polarized light, send the rotated first polarized light to the third port of the PSR, and send the second polarized light to the second port of the PSR; and the PSR is further configured to combine the rotated first polarized light and the second polarized light to obtain an output signal light, and send the output signal light by using the first port of the PSR, where a polarization direction of the output signal light is perpendicular to a polarization direction of the input signal light.

According to a third aspect, an encoding structure is provided, including a beam splitter, an optical reflector, and an encoding apparatus, where the beam splitter is configured to: receive an input signal light, split the input signal light into a first polarized light and a second polarized light, send the first polarized light to the optical reflector, and send the second polarized light to the encoding apparatus, where an optical path from the beam splitter to the optical reflector is not equal to an optical path from the beam splitter to the encoding apparatus; the optical reflector includes a PSR and a polarization rotation structure, where the PSR has three ports, receives the first polarized light by using a first port of the PSR, splits the first polarized light into a first sub-polarized light and a second sub-polarized light, and sends the first sub-polarized light and the second sub-polarized light to the polarization rotation structure by using a second port of the PSR and a third port of the PSR respectively, where a polarization mode of the first sub-polarized light is the same as a polarization mode of the second sub-polarized light; the polarization rotation structure is configured to: rotate a polarization direction of the first sub-polarized light by 180 degrees to obtain a rotated first sub-polarized light, send the rotated first sub-polarized light to the third port of the PSR, and send the second sub-polarized light to the second port of the PSR; and the PSR is further configured to combine the rotated first sub-polarized light and the second sub-polarized light to obtain a third polarized light, and send the third polarized light to the beam splitter by using the first port of the PSR, where a polarization direction of the third polarized light is perpendicular to a polarization direction of the first polarized light; the encoding apparatus includes a PSR, a polarization rotation structure, and a modulator, where the PSR has three ports, receives the second polarized light by using a first port of the PSR, splits the second polarized light into a third sub-polarized light and a fourth sub-polarized light, sends the third sub-polarized light to the polarization rotation structure by using a second port of the PSR, and sends the fourth sub-polarized light to the modulator by using a third port of the PSR, where a polarization mode of the third sub-polarized light is the same as a polarization mode of the fourth sub-polarized light; the polarization rotation structure is configured to rotate a polarization direction of the third sub-polarized light by 180 degrees to obtain a rotated third sub-polarized light, and send the rotated third sub-polarized light to the modulator; the modulator is configured to modulate the rotated third sub-polarized light to obtain a first signal light, and send the first signal light to the third port of the PSR; and is further configured to modulate the fourth sub-polarized light to obtain a second signal light, and send the second signal light to the polarization rotation structure; the polarization rotation structure is further configured to send the second signal light to the second port of the PSR; and the PSR is further configured to combine the first signal light and the second signal light to obtain a fourth polarized light, and send the fourth polarized light to the beam splitter by using the first port of the PSR, where a polarization direction of the fourth polarized light is perpendicular to a polarization direction of the second polarized light; and the beam splitter is further configured to send the third polarized light and the fourth polarized light.

According to a fourth aspect, a quantum key sending device is provided, including a quantum light source, an encoding structure, and an attenuator, where the quantum light source is configured to emit an optical pulse, and send the optical pulse to the encoding structure; the encoding structure includes a beam splitter, an optical reflector, and an encoding apparatus, where the beam splitter is configured to: receive the optical pulse, split the optical pulse into a first polarized light and a second polarized light, send the first polarized light to the optical reflector, and send the second polarized light to the encoding apparatus, where a difference between an optical path from the beam splitter to the optical reflector and an optical path from the beam splitter to the encoding apparatus is N, and N is a natural number; the optical reflector includes a PSR and a polarization rotation structure, where the PSR has three ports, receives the first polarized light by using a first port of the PSR, splits the first polarized light into a first sub-polarized light and a second sub-polarized light, and sends the first sub-polarized light and the second sub-polarized light to the polarization rotation structure by using a second port of the PSR and a third port of the PSR respectively, where a polarization mode of the first sub-polarized light is the same as a polarization mode of the second sub-polarized light; the polarization rotation structure is configured to: rotate a polarization direction of the first sub-polarized light by 180 degrees to obtain a rotated first sub-polarized light, send the rotated first sub-polarized light to the third port of the PSR, and send the second sub-polarized light to the second port of the PSR; and the PSR is further configured to combine the rotated first sub-polarized light and the second sub-polarized light to obtain a third polarized light, and send the third polarized light to the beam splitter by using the first port of the PSR, where a polarization direction of the third polarized light is perpendicular to a polarization direction of the first polarized light; the encoding apparatus includes a PSR, a polarization rotation structure, and a modulator, where the PSR has three ports, receives the second polarized light by using a first port of the PSR, splits the second polarized light into a third sub-polarized light and a fourth sub-polarized light, sends the third sub-polarized light to the polarization rotation structure by using a second port of the PSR, and sends the fourth sub-polarized light to the modulator by using a third port of the PSR, where a polarization mode of the third sub-polarized light is the same as a polarization mode of the fourth sub-polarized light; the polarization rotation structure is configured to rotate a polarization direction of the third sub-polarized light by 180 degrees to obtain a rotated third sub-polarized light, and send the rotated third sub-polarized light to the modulator; the modulator is configured to modulate the rotated third sub-polarized light to obtain a first signal light, and send the first signal light to the third port of the PSR; and is further configured to modulate the fourth sub-polarized light to obtain a second signal light, and send the second signal light to the polarization rotation structure; the polarization rotation structure is further configured to send the second signal light to the second port of the PSR; and the PSR is further configured to combine the first signal light and the second signal light to obtain a fourth polarized light, and send the fourth polarized light to the beam splitter by using the first port of the PSR, where a polarization direction of the fourth polarized light is perpendicular to a polarization direction of the second polarized light; and the beam splitter is further configured to send the third polarized light and the fourth polarized light to the attenuator; and the attenuator is configured to attenuate the third polarized light and the fourth polarized light to a single-photon level, and send an attenuated third polarized light and an attenuated fourth polarized light by using a quantum channel.

According to a fifth aspect, a quantum key receiving device is provided, including a circulator, an encoding structure, a first single-photon detector, and a second single-photon detector, where the circulator is configured to receive an attenuated third polarized light and an attenuated fourth polarized light by using a quantum channel, and send the attenuated third polarized light and the attenuated fourth polarized light to the encoding structure;

the encoding structure includes a beam splitter, an optical reflector, and an encoding apparatus, where the beam splitter is configured to: receive the attenuated third polarized light and the attenuated fourth polarized light, split the attenuated third polarized light into a first sub-polarized light and a second sub-polarized light, split the attenuated fourth polarized light into a third sub-polarized light and a fourth sub-polarized light, send the first sub-polarized light and the third sub-polarized light to the optical reflector, and send the second sub-polarized light and the fourth sub-polarized light to the encoding apparatus, where a difference between an optical path from the beam splitter to the optical reflector and an optical path from the beam splitter to the encoding apparatus is N, and N is a natural number;

the optical reflector includes a PSR and a polarization rotation structure, where the PSR has three ports, receives the first sub-polarized light by using a first port of the PSR, splits the first sub-polarized light into a fifth sub-polarized light and a sixth sub-polarized light, and sends the fifth sub-polarized light and the sixth sub-polarized light to the polarization rotation structure by using a second port of the PSR and a third port of the PSR respectively, where a polarization mode of the fifth sub-polarized light is the same as a polarization mode of the sixth sub-polarized light; the polarization rotation structure is configured to: rotate a polarization direction of the fifth sub-polarized light by 180 degrees to obtain a rotated fifth sub-polarized light, send the rotated fifth sub-polarized light to the third port of the PSR, and send the sixth sub-polarized light to the second port of the PSR; the PSR is further configured to combine the rotated fifth sub-polarized light and the sixth sub-polarized light to obtain a first output polarized light, and send the first output polarized light to the beam splitter by using the first port of the PSR, where a polarization direction of the first output polarized light is perpendicular to a polarization direction of the first sub-polarized light; and the optical reflector performs the same processing on the third sub-polarized light to obtain a second output polarized light, and sends the second output polarized light to the beam splitter by using the first port of the PSR, where a polarization direction of the second output polarized light is perpendicular to a polarization direction of the third sub-polarized light;

the encoding apparatus includes a PSR, a polarization rotation structure, and a modulator, where the PSR has three ports, receives the second sub-polarized light by using a first port of the PSR, splits the second sub-polarized light into a seventh sub-polarized light and an eighth sub-polarized light, sends the seventh sub-polarized light to the polarization rotation structure by using a second port of the PSR, and sends the eighth sub-polarized light to the modulator by using a third port of the PSR, where a polarization mode of the seventh sub-polarized light is the same as a polarization mode of the eighth sub-polarized light; the polarization rotation structure is configured to rotate a polarization direction of the seventh sub-polarized light by 180 degrees to obtain a rotated seventh sub-polarized light, and send the rotated seventh sub-polarized light to the modulator; the modulator is configured to modulate the rotated seventh sub-polarized light to obtain a first signal light, and send the first signal light to the third port of the PSR; and is further configured to modulate the eighth sub-polarized light to obtain a second signal light, and send the second signal light to the polarization rotation structure; the polarization rotation structure is further configured to send the second signal light to the second port of the PSR; the PSR is further configured to combine the first signal light and the second signal light to obtain a third output polarized light, and send the third output polarized light to the beam splitter by using the first port of the PSR, where a polarization direction of the third output polarized light is perpendicular to a polarization direction of the second sub-polarized light; and the encoding apparatus performs the same processing on the fourth sub-polarized light to obtain a fourth output polarized light, and sends the fourth output polarized light to the beam splitter by using the first port of the PSR, where a polarization direction of the fourth output polarized light is perpendicular to the polarization direction of the second sub-polarized light;

the beam splitter is further configured to: make the second output polarized light and the third output polarized light interfere with each other to obtain a first interfered light and a second interfered light, and send the first interfered light and the second interfered light to the circulator and the second single-photon detector respectively;

the circulator is further configured to send the first interfered light to the first single-photon detector; and the two single-photon detectors are configured to detect the first interfered light and the second interfered light, respectively.

According to a sixth aspect, a quantum key distribution system is provided, including the sending device according to the fourth aspect and the receiving device according to the fifth aspect.

According to a seventh aspect, a quantum key sending device is provided, including a beam splitter, a single-photon detector, an attenuator, and an encoding apparatus, where the beam splitter includes at least three ports, where a first port and a second port are located on one side of the beam splitter, all remaining ports are located on the other side of the beam splitter, the first port is connected to the attenuator, the second port is connected to the single-photon detector, and the third port is connected to a quantum channel; the beam splitter is configured to: receive an optical pulse by using the quantum channel, split the optical pulse into a first optical pulse and a second optical pulse, and send the first optical pulse and the second optical pulse by using the first port and the second port respectively; the attenuator is further connected to the encoding apparatus, and is configured to attenuate an optical pulse input to the attenuator; the single-photon detector is configured to detect an optical pulse input to the single-photon detector, where detected information is used to indicate whether the detected optical pulse is attacked by a Trojan; the encoding apparatus includes a polarization splitter-rotator PSR, a polarization rotation structure, and a modulator, where the PSR has three ports, where a first port of the PSR is connected to the attenuator, a second port of the PSR is connected to the polarization rotation structure, and a third port of the PSR is connected to the modulator, and is configured to: receive an input optical pulse by using the first port of the PSR, split the input optical pulse into a first polarized light and a second polarized light, rotate a polarization direction of the first polarized light by 90 degrees to obtain a third polarized light, and send the first polarized light and the third polarized light by using the second port of the PSR and the third port of the PSR respectively; the modulator is further connected to the polarization rotation structure, and is configured to modulate an optical pulse input to the modulator; and the polarization rotation structure is configured to: rotate, by 180 degrees, a polarization direction of an optical pulse entering the polarization rotation structure from one side; and rotate, by 0 degrees, a polarization direction of an optical pulse entering the polarization rotation structure from the other side. Polarization directions of an output optical pulse and an input optical pulse of the encoding apparatus are perpendicular to each other.

According to an eighth aspect, a quantum key distribution system is provided, including the quantum key sending device according to the seventh aspect, and a receiving device of an existing reciprocating QKD system.

According to a ninth aspect, a remote modulation system is provided, including a laser, a polarization beam splitter PBS, a remote modulation apparatus, and a receiver, where
 the laser is connected to a second port of the PBS, and is configured to emit a first polarized light;
 the PBS has three ports, and is configured to receive the first polarized light by using the second port of the PBS, and send the first polarized light to the remote modulation apparatus by using a first port of the PBS through a transmission channel;
 the remote modulation apparatus includes a polarization splitter-rotator PSR, a polarization rotation structure, and a modulator, where the PSR has three ports, receives an input signal light by using a first port of the PSR, splits the input signal light into a second polarized light and a third polarized light, sends the second polarized light to the polarization rotation structure by using a second port of the PSR, and sends the third polarized light to the modulator by using a third port of the PSR, where the input signal light is obtained after the first polarized light passes through the transmission channel, and a polarization mode of the second polarized light is the same as a polarization mode of the third polarized light; the polarization rotation structure is configured to rotate a polarization direction of the second polarized light by 180 degrees to obtain a rotated second polarized light, and send the rotated second polarized light to the modulator; the modulator is configured to modulate the rotated second polarized light to obtain a first signal light, and send the first signal light to the third port of the PSR; and is further configured to modulate the third polarized light to obtain a second signal light, and send the second signal light to the polarization rotation structure; the polarization rotation structure is further configured to send the second signal light to the second port of the PSR; and the PSR is further configured to combine the first signal light and the second signal light to obtain an output signal light, and send the output signal light to the PBS by using the first port of the PSR through the transmission channel, where a polarization direction of the output signal light is perpendicular to a polarization direction of the input signal light;
 the PBS is further configured to receive a fourth polarized light by using the first port of the PBS, and send the fourth polarized light to the receiver by using a third port of the PBS, where the fourth polarized light is obtained after the output signal light passes through the transmission channel; and
 the receiver is configured to receive the fourth polarized light.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

In the following description, to illustrate rather than limit the present invention, specific details such as a particular system structure, an interface, and a technology are provided for a thorough understanding of the present invention. However, a person skilled in the art should understand that the present invention can still be implemented in other embodiments that lack these specific details. In other scenarios, detailed descriptions of well-known apparatuses, circuits, and methods are omitted to prevent unnecessary details from hindering description of the present invention.

When ordinal numbers such as "first", "second", "third", and "fourth" are used in the embodiments of the present invention, unless the ordinal numbers represent a sequence according to the context, it should be understood that the ordinal numbers are merely used for differentiation.

Figure 1:
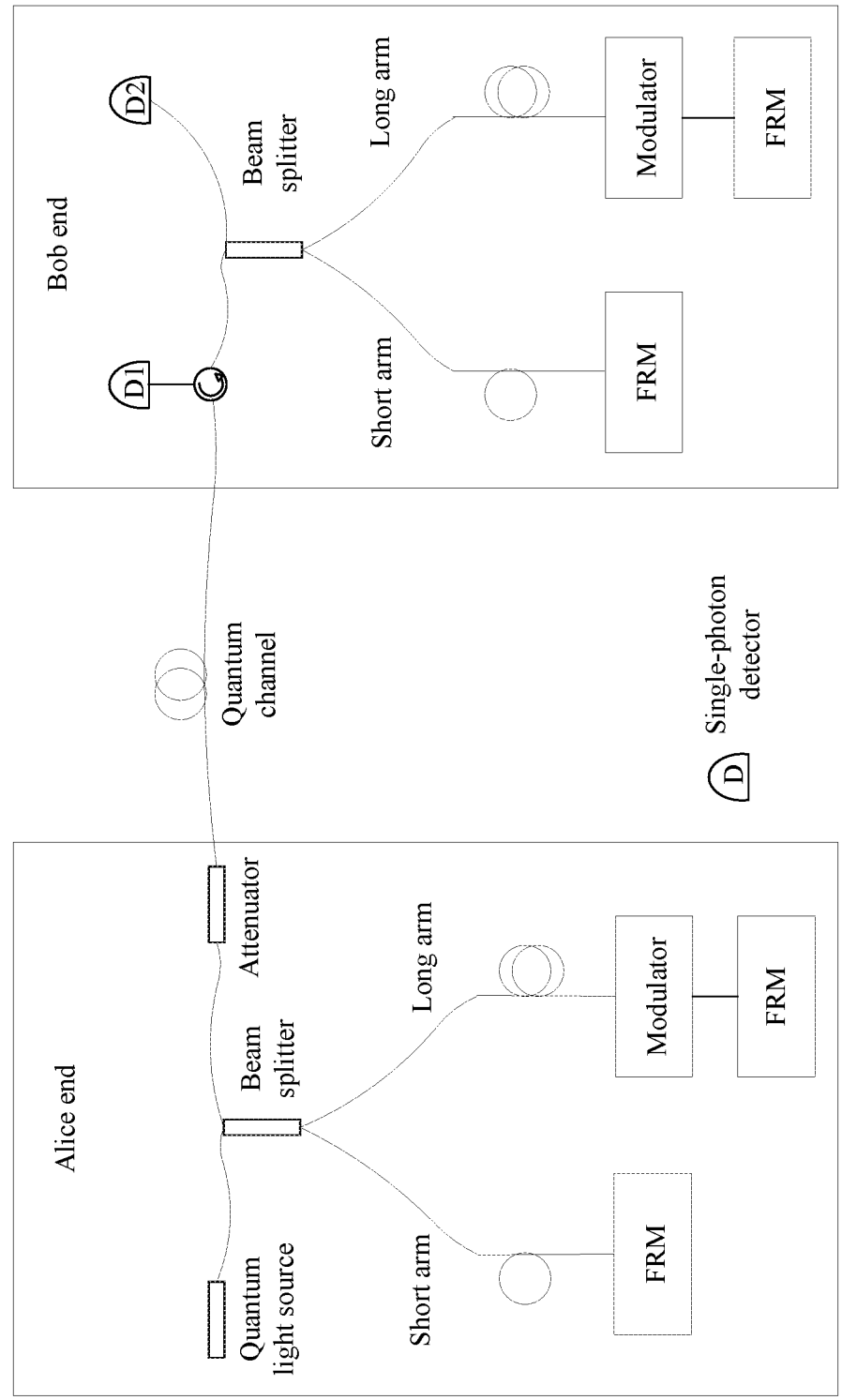
FIG. 1 shows an existing QKD system.
Figure 2:
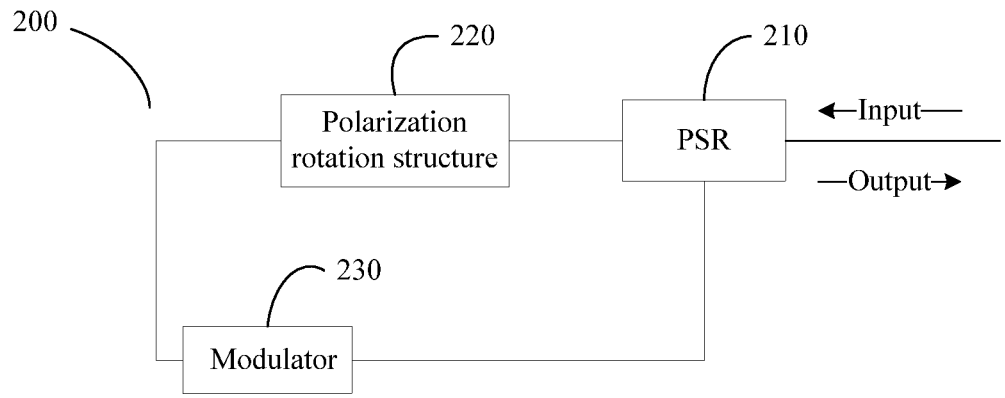
FIG. 2 shows an encoding apparatus according to an embodiment of the present invention.

An embodiment of the present invention provides an encoding apparatus 200 that can have a function of performing self-compensation for a polarization-dependent loss without changing a polarization state of an optical pulse by using a PC. As shown in FIG. 2, the encoding apparatus 200 includes a PSR 210, a polarization rotation structure 220, and a modulator 230.

The PSR 210 has three ports, receives an input signal light by using a first port of the PSR 210, splits the input signal light into a first polarized light and a second polarized light, sends the first polarized light to the polarization rotation structure 220 by using a second port of the PSR 210, and sends the second polarized light to the modulator 230 by using a third port of the PSR 210, where a polarization mode of the first polarized light is the same as a polarization mode of the second polarized light.

The PSR 210 can be implemented through interconnection between a PBS and a fast/slow axis of a polarization maintaining optical fiber. To be specific, after an incident light is divided into a TE polarized light and a TM polarized light by the PBS, polarization directions of an emergent TE polarized light and an emergent TM polarized light are both aligned with the fast axis of the polarization maintaining optical fiber or both aligned with the slow axis of the polarization maintaining optical fiber, instead of aligned with the fast axis and the slow axis respectively. In this case, polarized lights emergent from the PSR 210 are aligned with a same axial direction of the polarization maintaining optical fiber, and therefore have same polarization modes.

Figure 3A:
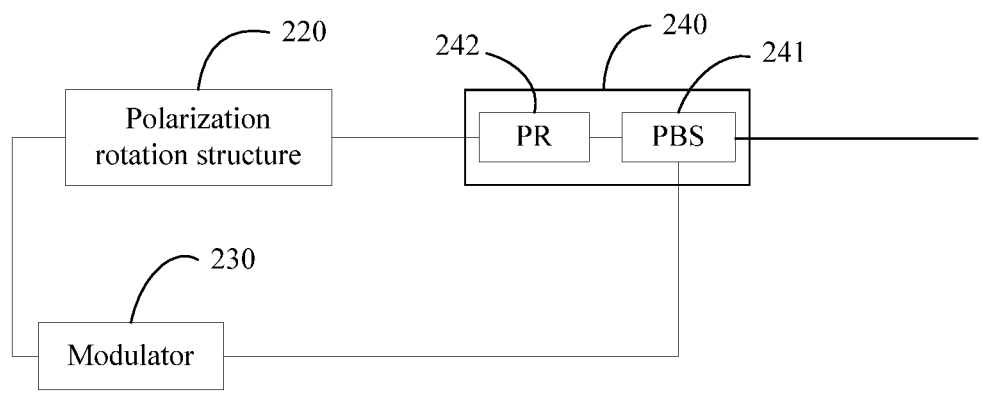
FIG. 3(a) shows an encoding apparatus according to another embodiment of the present invention.

Optionally, the PSR 210 further has another implementation structure 240. As shown in FIG. 3(a), the implementation structure 240 includes a PBS 241 and a PR 242. The PBS 241 is configured to split an input signal light into two polarized lights whose polarization directions are perpendicular to each other. The PR 242 is located between the PBS 241 and the polarization rotation structure 220, and is configured to rotate, in a first direction by 90 degrees, a polarization direction of a light passing through the PR 242, where the first direction is a clockwise direction or a counterclockwise direction.

It should be noted that, in all the embodiments of the present invention, a change of the polarization direction is observed against a light propagation direction.

The polarization rotation structure 220 is configured to rotate a polarization direction of the first polarized light by 180 degrees to obtain a rotated first polarized light, and send the rotated first polarized light to the modulator 230.

Figure 4A:
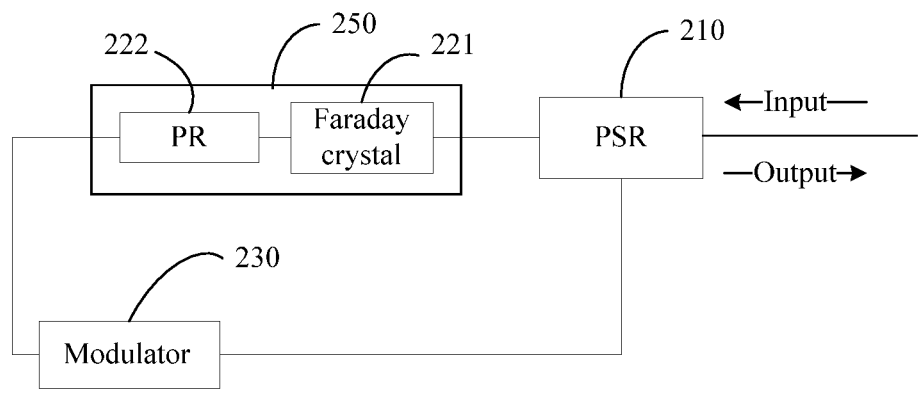
FIG. 4(a) shows an encoding apparatus according to another embodiment of the present invention.

Optionally, in another embodiment, an implementation structure 250 of the polarization rotation structure 220 is shown in FIG. 4(a). The implementation structure 250 includes a Faraday crystal 221 and a PR 222. The Faraday crystal 221 has two ports, and is configured to: rotate, in a first direction by 90 degrees, a polarization direction of a light incident from a first port of the Faraday crystal 221, and rotate, in a second direction by 90 degrees, a polarization direction of a light incident from a second port of the Faraday crystal 221, where the second direction is opposite to the first direction. The PR 222 has two ports, and is configured to rotate, in the first direction by 90 degrees, polarization directions of lights incident from the two ports of the PR 222, where a first port of the PR 222 is connected to any port of the Faraday crystal 221. Therefore, the polarization rotation structure 220 can perform a function of rotating, by 180 degrees, a polarization direction of a light incident from one end of the polarization rotation structure 220 and rotating, by 0 degrees, a polarization direction of a light incident from the other end of the polarization rotation structure 250.

Figure 4B:
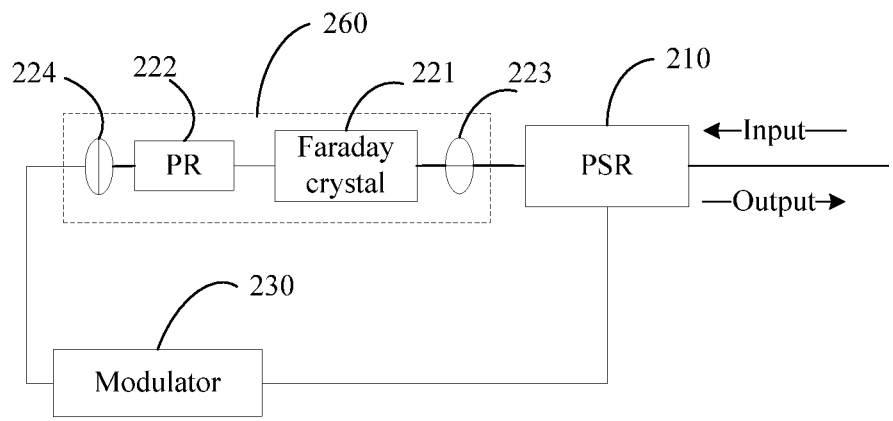
FIG. 4(b) shows an encoding apparatus according to another embodiment of the present invention.
Figure 4C:
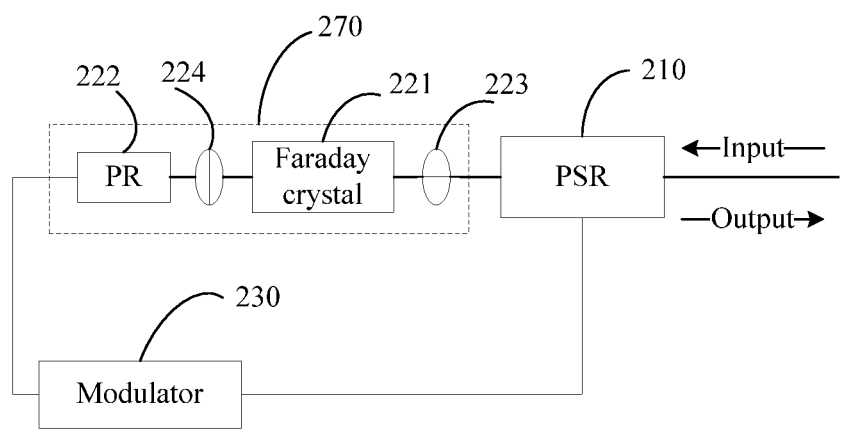
FIG. 4(c) shows an encoding apparatus according to another embodiment of the present invention.

Further, another implementation structure 260 of the polarization rotation structure 220 is shown in FIG. 4(b). The implementation structure 260 includes a first polarizer 223 and a second polarizer 224. The first polarizer 223 is located between the Faraday crystal 221 and the PSR 210, and is configured to limit a polarization direction of a light passing through the first polarizer 223 to a direction that is the same as or opposite to the polarization direction of the first polarized light. The second polarizer 224 is located between the PR 222 and the modulator 230, and is configured to limit a polarization direction of a light passing through the second polarizer 224 to a direction that is the same as or opposite to the polarization direction of the first polarized light. Alternatively, in an implementation structure 270 shown in FIG. 4(c), a position of the first polarizer 223 remains unchanged, and the second polarizer 224 is located between the Faraday crystal 221 and the PR 222, and is configured to limit a polarization direction of a light passing through the second polarizer 224 to a direction perpendicular to the polarization direction of the first polarized light.

Alternatively, positions of the Faraday crystal 221 and the PR 222 are interchanged. In other words, the first polarizer 223 may be located between the Faraday crystal 221 and the modulator 230, and the second polarizer 224 is located between the PR 222 and the PSR 210; or the first polarizer 223 is located between the Faraday crystal 221 and the modulator 230, and the second polarizer 224 is located between the Faraday crystal 221 and the PR 222. Functions of the two polarizers are consistent with those of the polarizers shown in FIG. 4(b) and FIG. 4(c).

The two polarizers can prevent a rotation angle of the Faraday crystal 221 from being affected by a temperature and an incident light wavelength. All angle deflections of the Faraday crystal 221 are converted into light intensity deflections. The light intensity deflection has extremely small impact on stability of polarization compensation, and a deviation angle of 1 degree causes merely a $1/10000000$ light intensity fluctuation. In a QKD system, a 1-degree deflection of a polarization direction has huge impact on security of the entire system, and an eavesdropper EVE can eavesdrop on useful information directly by using this vulnerability. However, a light intensity fluctuation almost has no impact on security of the system. Therefore, when the embodiments of the present invention are applied to the QKD system, security of the QKD system can be enhanced.

Figure 5:
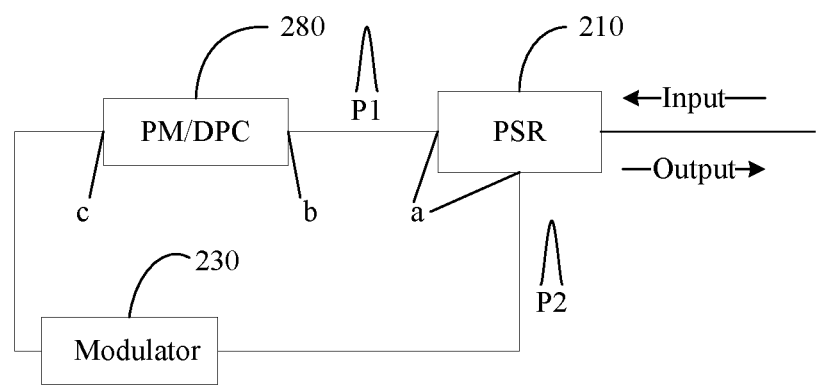
FIG. 5 shows an encoding apparatus according to another embodiment of the present invention.

Optionally, in another embodiment, as shown in FIG. 5, the polarization rotation structure 220 further has another implementation 280, including a phase modulator (PM) or a dynamic polarization controller (DPC).

Assuming that optical pulses incident from two ends of the polarization rotation structure 280 are denoted as P1 and P2, a polarization direction of P1 is rotated by 180 degrees, and a polarization direction of P2 is unchanged. Both the PM and the DPC are active controllers and cannot process optical signals incident from the two ends. This requires that when P2 arrives at the polarization rotation structure 280, P1 should have been processed and have completely left the polarization rotation structure 280. Therefore, the following relationship needs to be met: Tac≥Tab+Tbc+Wp. As shown in FIG. 5, Tab and Tac are respectively times spent by P1 and P2 to arrive at the polarization rotation structure 280, Tbc is a time required for polarization rotation of the optical pulse P1 in the polarization rotation structure 280, and Wp is an entire pulse width of the optical pulse P1. It should be noted that, although also being affected by an incident light wavelength and a temperature, the PM or the DPC can adjust and control a voltage in real time due to active modulation, to compensate for impact of the incident light wavelength and the temperature.

Generally, the PM is configured only to modulate a phase of an optical signal, but cannot adjust a polarization direction of the optical signal. However, if π phase modulation is applied to an optical signal, it is equivalent to that a polarization direction is rotated by 180 degrees. To be specific, it is assumed that a plane wave of the optical signal is $\overline{E}$, and changes to $\_\overline{E}$ after a polarization direction is rotated by 180 degrees. If π phase modulation is applied to the optical signal, the plane wave of the optical signal is also $\_\overline{E}$. The two cases have a same effect. It should be noted that, the PM can perform a function of adjusting a polarization direction of an optical signal only when modulating a π phase. The PM can support a modulation rate of a GHz level, and is applicable to a PLC technology. Therefore, the polarization rotation structure 280 using the PM meets high-speed communication requirements, and further facilitates miniaturized integration of a device.

The DPC is mainly classified into two types: an all-optical mechanical type and an electro-optic controlled type. The all-optical mechanical type is usually mechanically controlled and therefore has a relatively low speed, but the all-optical mechanical type directly acts on an optical fiber, has an advantage of a low insertion loss, and is applicable to a scenario in which a speed requirement is not high. The electro-optic controlled type includes types such as electro-optic, piezoelectric, magneto-optic, and liquid crystal; and controls a polarization state by using an applied electric field, so that a speed can reach a millisecond level, equivalent to a processing speed in the prior art. However, in this embodiment of the present invention, the DPC needs to be used only to rotate the polarization directions of P1 and P2 by 0 degrees and 180 degrees respectively. Therefore, control complexity is relatively low. In addition, the DPC is also applicable to the PLC technology, thereby facilitating the miniaturized integration of the device.

It should be noted that, if the PSR 210 and the polarization rotation structure 220 are integrated together, the foregoing devices are connected to each other by using an optical waveguide; or if the PSR 210 and the polarization rotation structure 220 are independent devices, the foregoing devices are connected to each other by using a polarization maintaining optical fiber.

The modulator 230 is configured to modulate the rotated first polarized light to obtain a first signal light, and send the first signal light to the third port of the PSR 210; and is further configured to modulate the second polarized light to obtain a second signal light, and send the second signal light to the polarization rotation structure 220.

Specifically, the modulator 230 may be an intensity modulator (IM), a PM, a quadrature phase shift keying modulator (QPSK Modulator), or the like. This is not limited in this embodiment of the present invention.

Optionally, optical paths from two ends of the modulator 230 to the PSR 210 are equal, thereby ensuring that the modulator 230 can simultaneously process the two polarized lights split by the PSR 210, and helping increase a processing speed. Specifically, the PSR 210, the polarization rotation structure 220, and the modulator 230 are connected to each other by using an optical waveguide or a polarization maintaining optical fiber.

It should be noted that, all high-rate modulators are polarization-dependent. A loss of an incident light in a TE polarization mode is different from a loss of the incident light in a TM polarization mode, and usually a difference is at least 20 dB. Usually, the loss in the TE polarization mode is approximately 6 dB, and the loss in the TM polarization mode is approximately 30 dB. A loss of 30 dB is unacceptable in a communications system, especially in a quantum communications system with very weak light intensity. In this embodiment of the present invention, the two polarized lights obtained through splitting by the PSR 210 have same polarization modes, and are both TE polarized lights, and the high-rate modulator can be supported, thereby avoiding introduction of a loss that cannot be accepted by the communications system.

It should be understood that if the encoding apparatus 200 uses a special modulator having a low loss for a TM polarized light, the two polarized lights obtained through splitting by the PSR 210 may alternatively be TM polarized lights in this embodiment of the present invention.

The polarization rotation structure 220 is further configured to send the second signal light to the second port of the PSR 210.

Optionally, for example, in the polarization rotation structure 250 shown in FIG. 4(a), the PR 222 is further configured to receive the first signal light from the third port of the PSR 210, and rotate a polarization direction of the first signal light in a first direction by 90 degrees, to obtain a rotated first signal light. The Faraday crystal 221 is further configured to rotate a polarization direction of the rotated first signal light in a second direction by 90 degrees, to restore the first signal light. The first direction is a clockwise direction or a counterclockwise direction, and the second direction is opposite to the first direction.

The PSR 210 is further configured to combine the first signal light and the second signal light to obtain an output signal light, and send the output signal light by using the first port of the PSR 210, where a polarization direction of the output signal light is perpendicular to a polarization direction of the input signal light.

Optionally, in another embodiment, the PSR 240 includes the PBS 241 and the PR 242. As shown in FIG. 3(a), the PBS 241 is further configured to combine two signal lights whose polarization directions are perpendicular to each other into the output signal light. The PR 242 is located between the PBS 241 and the polarization rotation structure 220, and is configured to rotate, in a first direction by 90 degrees, a polarization direction of a light passing through the PR 242, where the first direction is a clockwise direction or a counterclockwise direction.

Figure 3B:
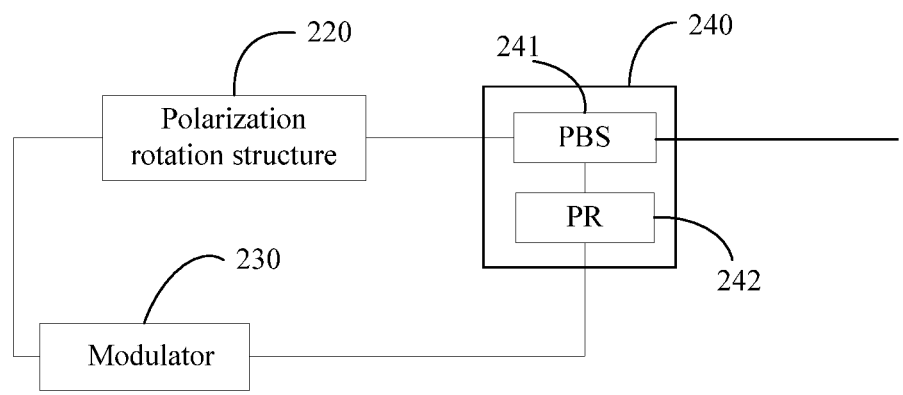
FIG. 3(b) shows an encoding apparatus according to another embodiment of the present invention.

Alternatively, the PSR 240 may be shown in FIG. 3(*b*), and include the PBS 241 and the PR 242, where the PR 242 is located between the PBS 241 and the modulator 230. A function of the PSR 240 is similar to that in the structure shown in FIG. 3(*a*), and details are not described herein again.

In conclusion, the encoding apparatus 200 provided in this embodiment of the present invention includes the PSR 210 having three ports, the polarization rotation structure 220, and the modulator 230. The input signal light is received by using the first port of the PSR 210, and the input signal light is split into the first polarized light and the second polarized light, where the polarization mode of the first polarized light is the same as the polarization mode of the second polarized light. The polarization direction of the first polarized light is rotated by 180 degrees to obtain the rotated first polarized light. The rotated first polarized light and the second polarized light are modulated to obtain the first signal light and the second signal light respectively. The first signal light and the second signal light are combined to obtain the output signal light. The output signal light is sent by using the first port of the PSR 210. The polarization direction of the output signal light is perpendicular to the polarization direction of the input signal light.

The encoding apparatus 200 provided in this embodiment of the present invention can support a high-rate modulator, thereby avoiding introduction of a loss that cannot be accepted by a communications system, and meeting high-speed communication requirements.

Figure 6:
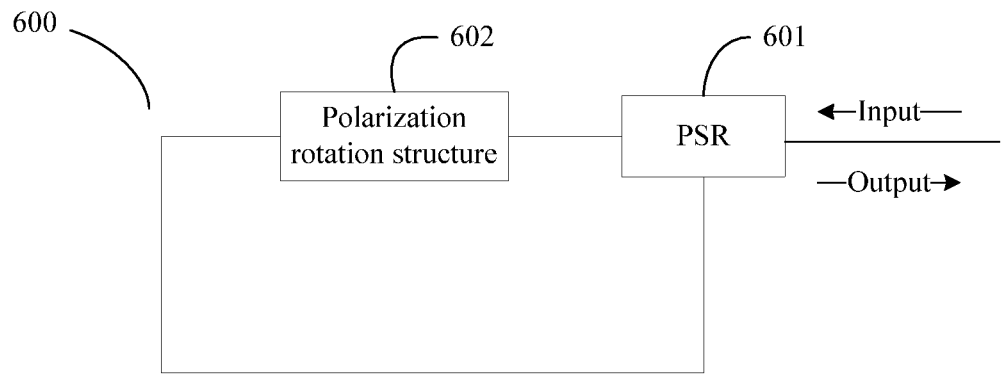
FIG. 6 shows an optical reflector according to another embodiment of the present invention.

An embodiment of the present invention further provides an optical reflector 600. As shown in FIG. 6, the optical reflector 600 includes a PSR 601 and a polarization rotation structure 602.

The PSR 601 has three ports, receives an input signal light by using a first port of the PSR 601, splits the input signal light into a first polarized light and a second polarized light, and sends the first polarized light and the second polarized light to the polarization rotation structure 602 by using a second port of the PSR 601 and a third port of the PSR 601 respectively, where a polarization mode of the first polarized light is the same as a polarization mode of the second polarized light.

The polarization rotation structure 602 is configured to: rotate a polarization direction of the first polarized light by 180 degrees to obtain a rotated first polarized light, send the rotated first polarized light to the third port of the PSR 601, and send the second polarized light to the second port of the PSR 601.

The PSR 601 is further configured to combine the rotated first polarized light and the second polarized light to obtain an output signal light, and send the output signal light by using the first port of the PSR 601, where a polarization direction of the output signal light is perpendicular to a polarization direction of the input signal light.

Figure 7:
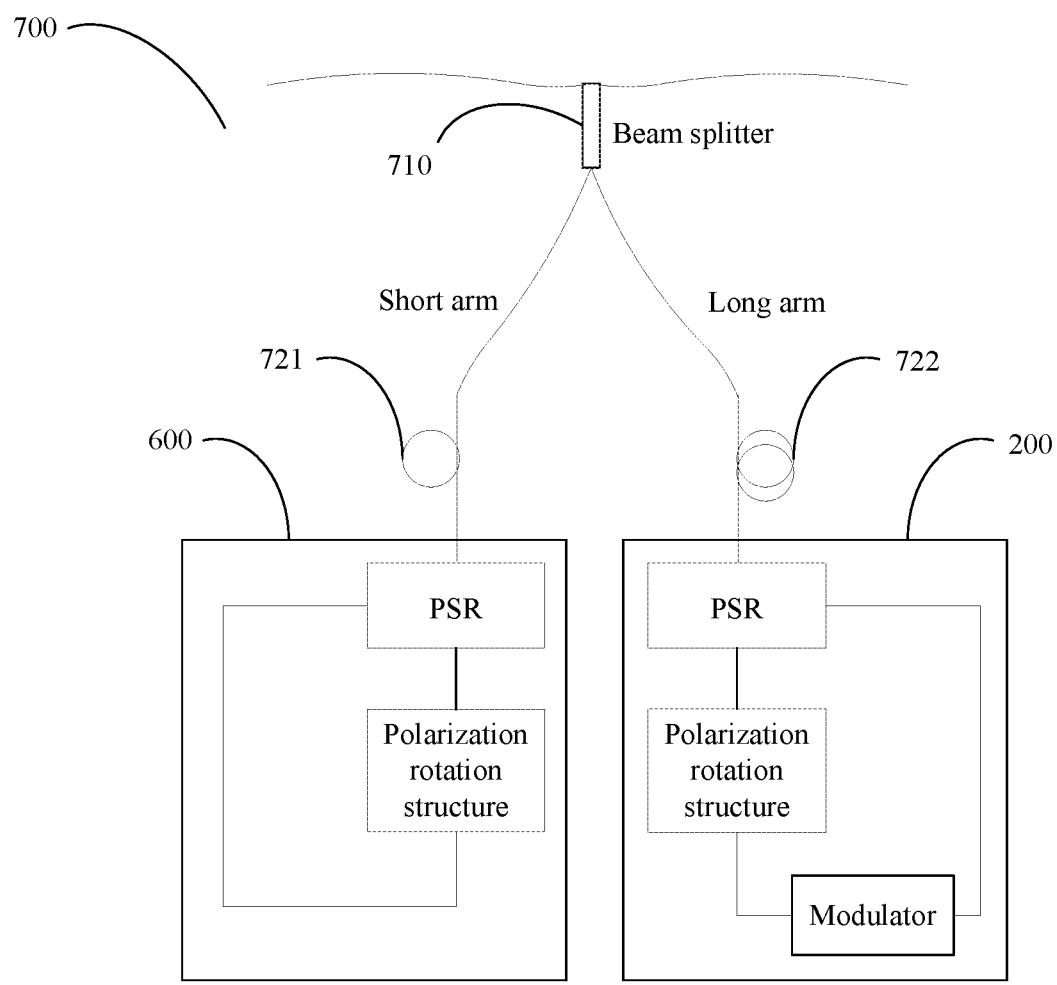
FIG. 7 shows an encoding structure according to another embodiment of the present invention.

Another embodiment of the present invention provides an encoding structure 700. A possible structure of the encoding structure 700 is shown in FIG. 7, and includes a beam splitter 710, an optical reflector 600, and an encoding apparatus 200.

The beam splitter 710 is configured to: receive an input signal light, split the input signal light into a first polarized light and a second polarized light, send the first polarized light to the optical reflector 600, and send the second polarized light to the encoding apparatus 200, where an optical path from the beam splitter 710 to the optical reflector 600 is not equal to an optical path from the beam splitter 710 to the encoding apparatus 200.

The optical reflector 600 includes a PSR 601 and a polarization rotation structure 602. The PSR 601 has three ports, receives the first polarized light by using a first port of the PSR 601, splits the first polarized light into a first sub-polarized light and a second sub-polarized light, and sends the first sub-polarized light and the second sub-polarized light to the polarization rotation structure 602 by using a second port of the PSR 601 and a third port of the PSR 601 respectively, where a polarization mode of the first sub-polarized light is the same as a polarization mode of the second sub-polarized light. The polarization rotation structure 602 is configured to: rotate a polarization direction of the first sub-polarized light by 180 degrees to obtain a rotated first sub-polarized light, send the rotated first sub-polarized light to the third port of the PSR 601, and send the second sub-polarized light to the second port of the PSR 601. The PSR 601 is further configured to combine the rotated first sub-polarized light and the second sub-polarized light to obtain a third polarized light, and send the third polarized light to the beam splitter 710 by using the first port of the PSR 601, where a polarization direction of the third polarized light is perpendicular to a polarization direction of the first polarized light.

The encoding apparatus 200 includes a PSR 210, a polarization rotation structure 220, and a modulator 230. The PSR 210 has three ports, receives the second polarized light by using a first port of the PSR 210, splits the second polarized light into a third sub-polarized light and a fourth sub-polarized light, sends the third sub-polarized light to the polarization rotation structure 220 by using a second port of the PSR 210, and sends the fourth sub-polarized light to the modulator 230 by using a third port of the PSR 210, where a polarization mode of the third sub-polarized light is the same as a polarization mode of the fourth sub-polarized light. The polarization rotation structure 220 is configured to rotate a polarization direction of the third sub-polarized light by 180 degrees to obtain a rotated third sub-polarized light, and send the rotated third sub-polarized light to the modulator 230. The modulator 230 is configured to modulate the rotated third sub-polarized light to obtain a first signal light, and send the first signal light to the third port of the PSR 210; and is further configured to modulate the fourth sub-polarized light to obtain a second signal light, and send the second signal light to the polarization rotation structure 220. The polarization rotation structure 220 is further configured to send the second signal light to the second port of the PSR 210. The PSR 210 is further configured to combine the first signal light and the second signal light to obtain a fourth polarized light, and send the fourth polarized light to the beam splitter 710 by using the first port of the PSR 210, where a polarization direction of the fourth polarized light is perpendicular to a polarization direction of the second polarized light. The beam splitter 710 is further configured to send the third polarized light and the fourth polarized light.

Specifically, because the optical path from the beam splitter 710 to the optical reflector 600 is not equal to the optical path from the beam splitter 710 to the encoding apparatus 200, the third polarized light and the fourth polarized light do not arrive at the beam splitter 710 at the same time.

Optionally, the encoding structure 700 further includes two optical delay lines 720, where a first optical delay line 721 is located between the beam splitter 710 and the optical reflector 600, a second optical delay line 722 is located between the beam splitter 710 and the encoding apparatus 200, and a length of the first optical delay line 721 is different from a length of the second optical delay line 722.

In this embodiment of the present invention, the encoding structure 700 uses the optical reflector 600 and the encoding apparatus 200, and therefore can also support a high-rate modulator, thereby meeting high-speed communication requirements.

It should be understood that FIG. 7 shows a possible encoding structure 700, and positions of the optical reflector 600 and the encoding apparatus 200 can be interchanged. This is not limited in this embodiment.

Figure 8:
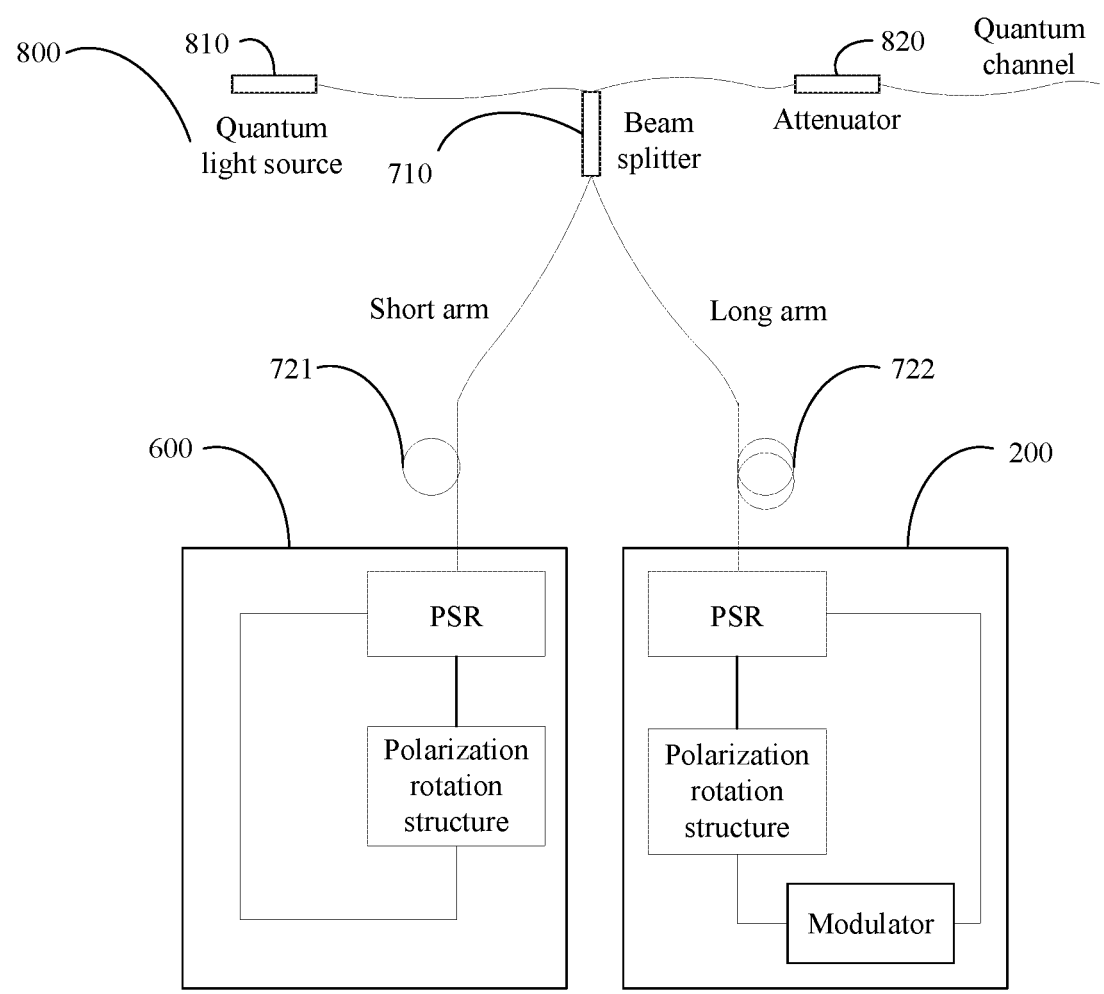
FIG. 8 shows a quantum key sending device according to another embodiment of the present invention.

Another embodiment of the present invention provides a quantum key sending device 800. As shown in FIG. 8, the quantum key sending device 800 includes a quantum light source 810, an encoding structure 700, and an attenuator 820.

The quantum light source 810 is configured to emit an optical pulse, and send the optical pulse to the encoding structure 700.

The encoding structure 700 is the encoding structure shown in FIG. 7. The optical pulse sent by the quantum light source is an input signal light of the encoding structure 700. A third polarized light and a fourth polarized light are obtained by processing the input signal light in a same manner, and are sent to the attenuator 820. The manner of processing an input signal light is described in detail in the foregoing embodiment, and details are not described herein again in this embodiment of the present invention.

Specifically, an optical reflector 600 and an encoding apparatus 200 in the encoding structure 700 each further include an optical switch or an IM. In this case, the quantum key sending device 800 can support a six-state quantum key distribution protocol or a reference frame independent protocol that is used to perform encoding based on a phase and a path.

The attenuator 820 is configured to attenuate the third polarized light and the fourth polarized light to a single-photon level, and send an attenuated third polarized light and an attenuated fourth polarized light by using a quantum channel.

The single-photon level means that a quantity of photons included in each optical pulse on average is a single digit. To be specific, energy of each optical pulse is proximately 1e-19 or 1e-18 joules.

The quantum key sending device provided in this embodiment of the present invention can support a high-rate modulator, thereby meeting high-speed communication requirements.

Figure 9:
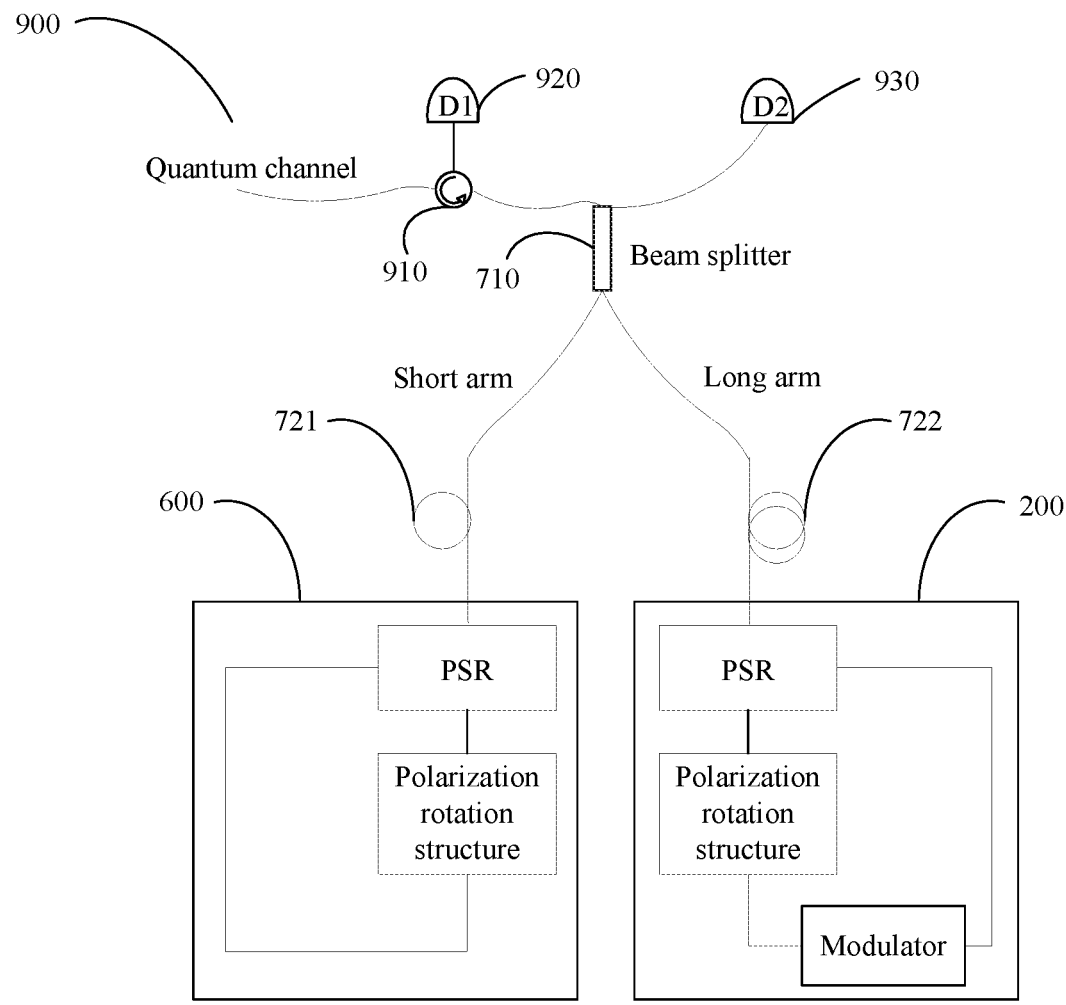
FIG. 9 shows a quantum key receiving device according to another embodiment of the present invention.

Another embodiment of the present invention provides a quantum key receiving device 900. As shown in FIG. 9, the quantum key receiving device 900 includes a circulator 910, an encoding structure 700, a first single-photon detector 920, and a second single-photon detector 930.

The circulator 910 is configured to receive an attenuated third polarized light and an attenuated fourth polarized light by using a quantum channel, and send the attenuated third polarized light and the attenuated fourth polarized light to the encoding structure 700, where polarization directions of the two polarized lights are the same.

The encoding structure 700 is the encoding structure shown in FIG. 7, and includes a beam splitter 710, an optical reflector 600, and an encoding apparatus 200. The attenuated third polarized light and the attenuated fourth polarized light are both input signal lights of the encoding structure 700, and are denoted as a first input signal light and a second input signal light.

The beam splitter 710 is configured to: receive the two input signal lights, split the first input signal light into a first sub-polarized light and a second sub-polarized light, split the second input signal light into a third sub-polarized light and a fourth sub-polarized light, send the first sub-polarized light and the third sub-polarized light to the optical reflector 600, and send the second sub-polarized light and the fourth sub-polarized light to the encoding apparatus 200, where a difference between an optical path from the beam splitter 710 to the optical reflector 600 and an optical path from the beam splitter 710 to the encoding apparatus 200 is equal to a corresponding optical path difference in a sending device.

The optical reflector 600 is configured to receive the first sub-polarized light and the third sub-polarized light, and separately process the two polarized lights, to obtain a first output polarized light and a second output polarized light, where both the first sub-polarized light and the third sub-polarized light are input signal lights of the optical reflector 600. A specific processing manner is described in the foregoing embodiments, and details are not described herein again in the present invention.

The encoding apparatus 200 is configured to receive the second sub-polarized light and the fourth sub-polarized light, and separately process the two polarized lights, to obtain a third output polarized light and a fourth output polarized light, where both the second sub-polarized light and the fourth sub-polarized light are input signal lights of the encoding apparatus 200. A specific processing manner is also described in the foregoing embodiments, and details are not described herein again in the present invention.

The beam splitter 710 is further configured to: make the second output polarized light and the third output polarized light interfere with each other to obtain a first interfered light and a second interfered light, and send the first interfered light and the second interfered light to the circulator 910 and the second single-photon detector 930 respectively.

Specifically, in the encoding structure 700, the optical path from the beam splitter 710 to the optical reflector 600 is not equal to the optical path from the beam splitter 710 to the encoding apparatus 200. Assuming that the optical path from the beam splitter 710 to the optical reflector 600 is shorter, the path from the beam splitter 710 to the optical reflector 600 is referred to as a short arm, and the path from the beam splitter 710 to the encoding apparatus 200 is referred to as a long arm. Therefore, the sending device sends two polarized lights. In the receiving device, assuming that the first polarized light arrives earlier than the second polarized light, the beam splitter 710 in the encoding structure 700 splits the first polarized light into a first sub-polarized light and a second sub-polarized light, and splits the second polarized light into a third sub-polarized light and a fourth sub-polarized light. The first sub-polarized light and the third sub-polarized light pass through the short arm. After the first sub-polarized light and the third sub-polarized light pass through the optical reflector 600, a first output polarized light and a second output polarized light are obtained respectively. The second sub-polarized light and the fourth sub-polarized light pass through the long arm. After the second sub-polarized light and the fourth sub-polarized light pass through the encoding apparatus 200, a third output polarized light and a fourth output polarized light are obtained respectively. Because the encoding structures in the receiving device and the sending device are identical, and are both the encoding structure 700 shown in FIG. 7, the difference between the optical path from the beam splitter 710 to the optical reflector 600 and the optical path from the beam splitter 710 to the encoding apparatus 200 in the receiving device is consistent with the corresponding optical path difference in the sending device. In other words, a light passing through the long arm in the sending device and the short arm in the receiving device and a light passing through the short arm in the sending device and the long arm in the receiving device arrive at the beam splitter at the same time. Therefore, the second output polarized light and the third output polarized light arrive at the beam splitter 710 at the same time, and interfere with each other at the beam splitter 710 to obtain a first interfered light and a second interfered light.

The circulator 910 is further configured to send the first interfered light to the first single-photon detector 920.

The two single-photon detectors are configured to detect the first interfered light and the second interfered light respectively, and obtain a quantum key according to a related quantum key distribution protocol.

It should be noted that, to obtain the quantum key from the first interfered light and the second interfered light, the two output signal lights that interfere with each other need to carry modulated information of the sending device and modulated information of the receiving device respectively. In this embodiment of the present invention, because the first polarized light arrives at the receiving device earlier than the second polarized light, the first polarized light passes through the short arm in the sending device, and the second polarized light passes through the long arm in the sending device. Assuming that the encoding apparatus 200 is on the short arm, the second output polarized light carries the modulated information of the sending device, and the third output polarized light carries the modulated information of the receiving device. Assuming that the encoding apparatus 200 is on the long arm, the second output polarized light carries the modulated information of the receiving device, and the third output polarized light carries the modulated information of the sending device. Therefore, the quantum key can be obtained according to this embodiment of the present invention.

Figure 10:
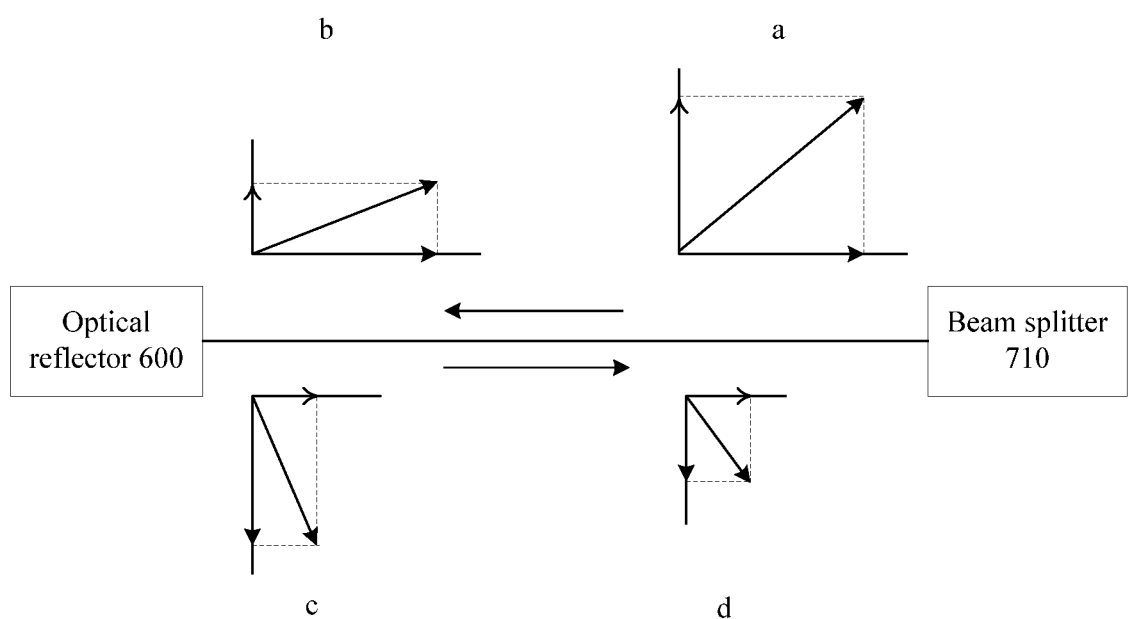
FIG. 10 is a schematic diagram of a change of a polarization direction of an optical pulse.

In addition, the encoding structure provided in this embodiment of the present invention further has a function of performing self-compensation for a polarization-dependent loss. Each light can be divided into two polarized lights whose polarization directions are perpendicular to each other, and a polarization-dependent loss is mainly caused by inconsistent losses in the two polarization directions of the light. It is assumed that in a process in which an input signal light arrives at the optical reflector 600 from the beam splitter 710, a loss of a TE polarized light of the input signal light is 1 dB, and a loss of a TM polarized light of the input signal light is 3 dB. Therefore, a polarization direction of the input signal light when the input signal light arrives at the optical reflector 600 is different from a polarization direction of the input signal light when the input signal light is at the beam splitter 710. As shown in FIG. 10, a polarization direction of the input signal light at a position b is different from a polarization direction of the input signal light at a position a. If a polarization direction of an output signal light of the optical reflector 600 is perpendicular to a polarization direction of an input signal light, a TE polarized light of the output signal light corresponds to a TM polarized light of the input signal light, and a TM polarized light of the output signal light corresponds to a TE polarized light of the input signal light. Therefore, after an entire process in which an input signal light arrives at the optical reflector 600 from the beam splitter 710 and then an output signal light returns to the beam splitter 710, light losses in the two polarization directions are both 4 dB, that is, losses in the two polarization directions are consistent. To be specific, a polarization-dependent loss introduced in an intermediate transmission process is 0, and the polarization direction of the output signal light sent back to the beam splitter 710 is perpendicular to the polarization direction of the input signal light sent from the beam splitter 710. As shown in FIG. 10, a polarization direction of the input signal light at a position d is perpendicular to a polarization direction of the input signal light at the position a. Because polarization directions of an output light and an input light that pass through the encoding apparatus 200 are also perpendicular to each other, it can also be ensured that after an entire process in which an input signal light arrives at the encoding apparatus 200 from the beam splitter 710 and then an output signal light returns to the beam splitter 710, losses in the two polarization directions are consistent.

Therefore, the receiving device provided in this embodiment of the present invention can support a high-rate modulator, thereby meeting high-speed communication requirements; and can further perform self-compensation for a polarization-dependent loss in the receiving device, thereby ensuring that polarization directions of two output polarized lights that interfere with each other are consistent, enhancing an interference effect, and helping increase a quantum key generation rate.

Another embodiment of the present invention provides a QKD system, including the quantum key sending device 800 and the quantum key receiving device 900 described in the foregoing embodiments. A specific working procedure is as follows:

A quantum light source 810 is located in the sending device 800, and is configured to generate an optical pulse. The optical pulse passes through a beam splitter 710, and is divided into two polarized lights P1 and P2. The polarized light P1 passes through a short arm, and P2 passes through a long arm. After passing through an optical reflector 600, P1 returns to the beam splitter 710. After passing through an encoding apparatus 200, P2 returns to the beam splitter 710. After passing through the attenuator 820 sequentially and being attenuated to a single-photon level, the two polarized lights P1 and P2 are sent to the receiving device 900 by using a quantum channel. P2 is added with information about the sending device in the encoding apparatus 200 through modulation.

In the receiving device 900, P1 and P2 are sequentially received by a circulator 910, and sent to a beam splitter 710, the polarized light P1 is divided into P11 and P12, and the polarized light P2 is divided into P20 and P22, where P11 and P20 pass through a short arm, and P12 and P22 pass through a long arm. After passing through an optical reflector 600, P11 and P20 return to the beam splitter 710. After passing through an encoding apparatus 200 and being added with information about the receiving device through modulation, P12 and P22 return to the beam splitter 710. Because an optical path difference between the long arm and the short arm in the receiving device 900 is equal to that in the sending device 800, P12 and P20 arrive at the beam splitter 710 at the same time and interfere with each other in the beam splitter 710. Interference signals are obtained by two single-photon detectors 920 and 930. A quantum key can be obtained by processing detection results of the two single-photon detectors according to a corresponding quantum key distribution protocol.

It should be understood that, a process in which the optical reflector 600 and the encoding apparatus 200 process the polarized light is described in detail in the foregoing embodiments. Details are not described herein again in this embodiment of the present invention.

The QKD system provided in this embodiment of the present invention can support a high-rate modulator, thereby meeting high-speed communication requirements; and can further perform self-compensation for a polarization-dependent loss in the system, thereby ensuring that polarization directions of two output polarized lights that interfere with each other are consistent, enhancing an interference effect, and helping increase a quantum key generation rate.

Figure 11:
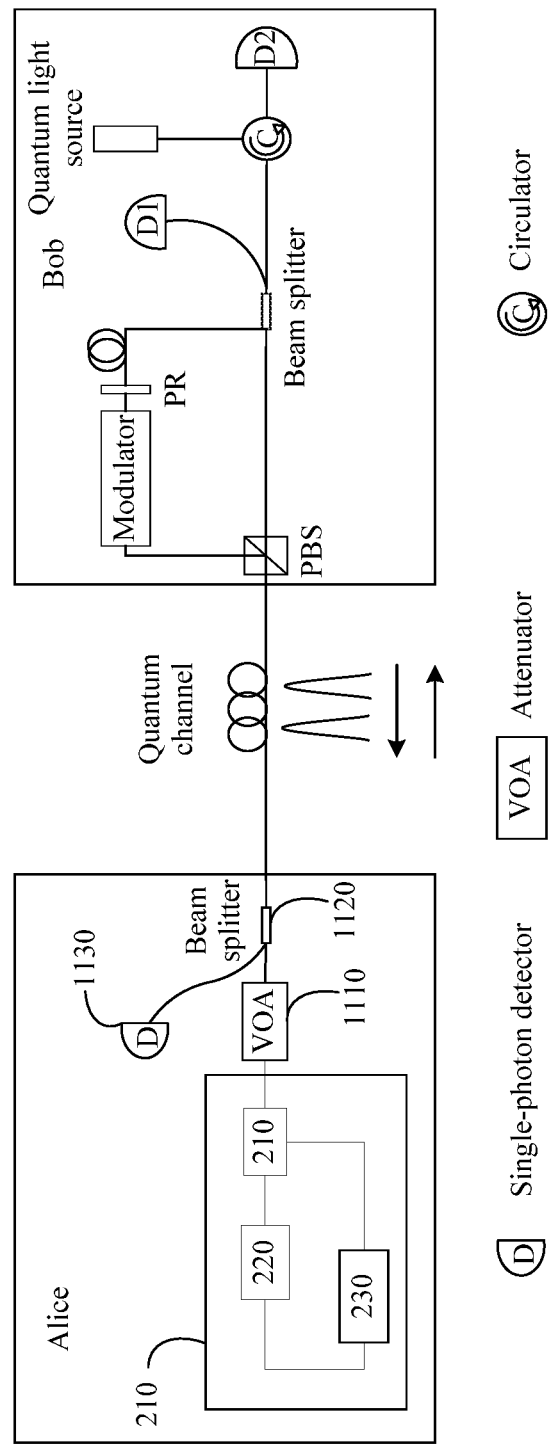
FIG. 11 shows a QKD system according to another embodiment of the present invention.

Another embodiment of the present invention provides a QKD system. As shown in FIG. 11, the QKD system includes an Alice end and a Bob end. The Alice end includes an encoding apparatus 200, an attenuator 1110, a beam splitter 1120, and a single-photon detector 1130. The Bob end uses a Bob end of an existing reciprocating QKD system.

The beam splitter 1120 includes at least three ports, where a first port and a second port are located on one side of the beam splitter 1120, all remaining ports are located on the other side of the beam splitter 1120, the first port is connected to the attenuator 1110, the second port is connected to the single-photon detector 1130, and a third port is connected to a quantum channel. The beam splitter 1120 is configured to: receive an optical pulse by using the quantum channel, split the optical pulse into a first optical pulse and a second optical pulse, and send the first optical pulse and the second optical pulse by using the first port and the second port respectively.

The attenuator 1110 is further connected to the encoding apparatus 200, and is configured to attenuate an optical pulse input to the attenuator 1110.

The single-photon detector 1130 is configured to detect an optical pulse input to the single-photon detector 1130, where detected information is used to indicate whether the detected optical pulse is attacked by a Trojan.

The encoding apparatus 200 includes a PSR 210, a polarization rotation structure 220, and a modulator 230. The PSR 210 has three ports, where a first port of the PSR 210 is connected to the attenuator 1110, a second port of the PSR 210 is connected to the polarization rotation structure 220, and a third port of the PSR 210 is connected to the modulator 230. The PSR 210 is configured to: receive an input optical pulse by using the first port of the PSR 210, split the input optical pulse into a first polarized light and a second polarized light, rotate a polarization direction of the first polarized light by 90 degrees to obtain a third polarized light, and send the first polarized light and the third polarized light by using the second port of the PSR 210 and the third port of the PSR 210 respectively. The modulator 230 is further connected to the polarization rotation structure 220, and is configured to modulate an optical pulse input to the modulator 230. The polarization rotation structure 220 is configured to rotate, by 180 degrees, a polarization direction of an optical pulse entering the polarization rotation structure 220 from one side; and rotate, by 0 degrees, a polarization direction of an optical pulse entering the polarization rotation structure 220 from the other side. Polarization directions of an output optical pulse and an input optical pulse of the encoding apparatus 200 are perpendicular to each other.

Compared with the existing reciprocating QKD system, the QKD system provided in this embodiment of the present invention does not need to use a PC at a transmit end, thereby avoiding impact of a PC offset correction speed, and improving a system rate.

In addition, the encoding apparatus 200 may be not only applied to the field of quantum communications as an encoding apparatus of a QKD system, but also applied to the classical optical field as a remote modulation apparatus.

Figure 12:
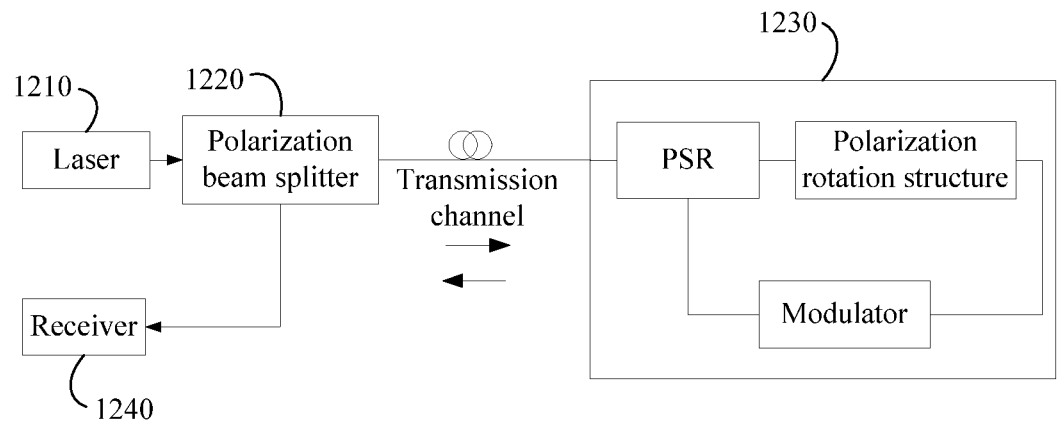
FIG. 12 shows a remote modulation system according to another embodiment of the present invention.

Another embodiment of the present invention provides a remote modulation system. As shown in FIG. 12, the remote modulation system includes a laser 1210, a PBS 1220, a remote modulation apparatus 1230, and a receiver 1240.

The laser 1210 is connected to a second port of the PBS 1220, and is configured to emit a first polarized light.

It should be noted that a light generated by the laser may be a TE polarized light or a TM polarized light.

The PBS 1220 has three ports, and is configured to receive the first polarized light by using the second port of the PBS 1220, and send the first polarized light to the remote modulation apparatus 1230 by using a first port of the PBS 1220 through a transmission channel.

The remote modulation apparatus 1230 includes a PSR 1231, a polarization rotation structure 1232, and a modulator 1233. The PSR 1231 has three ports, receives an input signal light by using a first port of the PSR 1231, splits the input signal light into a second polarized light and a third polarized light, sends the second polarized light to the polarization rotation structure 1232 by using a second port of the PSR 1231, and sends the third polarized light to the modulator 1233 by using a third port of the PSR 1231, where the input signal light is obtained after the first polarized light passes through the transmission channel, and a polarization mode of the second polarized light is the same as a polarization mode of the third polarized light. The polarization rotation structure 1232 is configured to rotate a polarization direction of the second polarized light by 180 degrees to obtain a rotated second polarized light, and send the rotated second polarized light to the modulator 1233. The modulator 1233 is configured to modulate the rotated second polarized light to obtain a first signal light, and send the first signal light to the third port of the PSR 1231; and is further configured to modulate the third polarized light to obtain a second signal light, and send the second signal light to the polarization rotation structure 1232. The polarization rotation structure 1232 is further configured to send the second signal light to the second port of the PSR 1231. The PSR 1231 is further configured to combine the first signal light and the second signal light to obtain an output signal light, and send the output signal light to the PBS 1220 by using the first port of the PSR 1231 through the transmission channel, where a polarization direction of the output signal light is perpendicular to a polarization direction of the input signal light.

Specifically, the modulator in the remote modulation apparatus 1230 may be a PM, an IM, a QPSK modulator, or the like. This is not limited in this embodiment of the present invention.

The PBS 1220 is further configured to receive a fourth polarized light by using the first port of the PBS 1220, and send the fourth polarized light to the receiver 1240 by using a third port of the PBS 1220, where the fourth polarized light is obtained after the output signal light passes through the transmission channel.

The receiver 1240 is configured to receive the fourth polarized light.

In the remote modulation system provided in this embodiment of the present invention, it is assumed that the polarized light generated by the laser 1210 is the TE polarized light, the first port of the PBS 1220 is connected to the transmission channel, the second port of the PBS 1220 is a TE polarization port, and the third port of the PBS 1220 is a TM polarization port. A working procedure of the remote modulation system is as follows:

The laser 1210 generates the TE polarized light. The TE polarized light arrives at the second port of the PBS 1220, and then arrives at the remote modulation apparatus 1230 through the transmission channel. Due to impact of the transmission channel, a polarization direction of the TE polarized light changes. A light arriving at the remote modulation apparatus 1230 may be denoted as an input signal light. In the remote modulation apparatus 1230, the input signal light is modulated to obtain an output signal light, and the output signal light is reflected. Because polarization directions of the output signal light and the input signal light of the remote modulation apparatus 1230 are perpendicular to each other, the remote modulation apparatus 1230 has a function of performing self-compensation for a polarization-dependent loss. To be specific, when the output signal light returns to the PBS 1220, the polarization direction of the output signal light is perpendicular to the polarization direction of the TE polarized light emitted by the PBS 1220. In other words, the output signal light changes to the TM polarized light. A specific principle of self-compensation for a polarization-dependent loss is described in the foregoing embodiments, and details are not described herein again.

Because the output signal light changes to the TM polarized light when returning to the PBS 1220 through the transmission channel, the output signal light is output by using the third port of the PBS 1220, and arrives at the receiver 1240. In the receiver 1240, the output signal light is demodulated, to extract modulated information.

In conclusion, in the remote modulation system provided in this embodiment of the present invention, the PBS 1220 sends only a light in one polarization direction to the receiver 1240, and only noise in a direction the same as the polarization direction is introduced, which is equivalent to that noise is attenuated by 3 dB. In addition, an insertion loss of the PBS is also lower than that of a circulator used by an existing remote modulation system.

It should be noted that if the modulator in the remote modulation apparatus 1230 is an IM, intensity of the input signal light is modulated, and the receiver 1240 may demodulate the output signal light in a direct detection manner; or if the modulator in the remote modulation apparatus 1230 is a PM, a QPSK modulator, or the like, the modulator performs phase modulation or both phase and intensity modulation on the input signal light. In this case, the receiver 1240 demodulates a received light in a coherent receiving manner by using a local oscillation light. The laser 1210, the PBS 1220, and the receiver 1240 are connected to each other by using a polarization maintaining optical fiber or a polarization maintaining waveguide.

Figure 13:
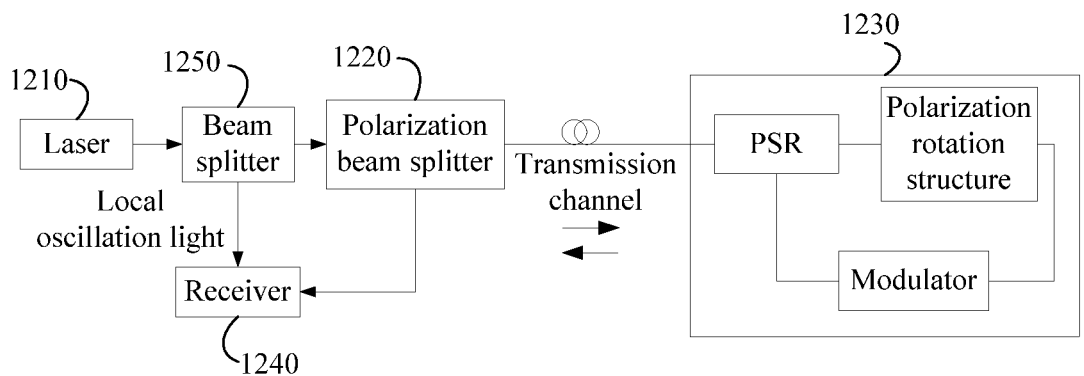
FIG. 13 shows a remote modulation system according to another embodiment of the present invention.

Optionally, as shown in FIG. 13, the remote modulation system further includes a beam splitter 1250. The beam splitter 1250 is located between the laser 1210 and the PBS 1220, and is configured to: split an output light of the laser 1210 into two lights, send one light to the PBS 1220, and send the other light to the receiver 1240 as a local oscillation light.

Figure 14:
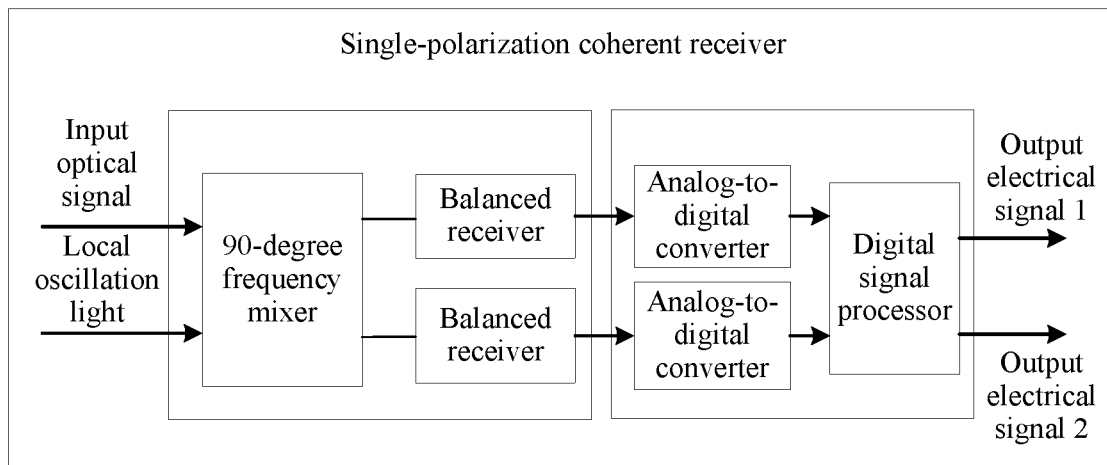
FIG. 14 shows a possible receiver structure in a remote modulation system according to another embodiment of the present invention.

In this case, the output signal light received by the receiver 1240 has a definite polarization direction, and does not need dual-polarization receiving. Therefore, compared with an existing coherent receiver, a single-polarization coherent receiver shown in FIG. 14 may be used as the receiver 1240. The single-polarization coherent receiver features a simple structure and a low insertion loss, bringing benefits of low costs, low power consumption, and long transmission distance to the entire system.

The foregoing descriptions are merely specific implementations of the present invention, but are not intended to limit the protection scope of the present invention. Any variation or replacement that can be readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus, comprising:
   a polarization splitter rotator (PSR) comprising three ports, the PSR is configured to: receive an input signal light through a first port of the PSR; split the input signal light into a first polarized light and a second polarized light; send the first polarized light to a polarization rotation structure through a second port of the PSR; and send the second polarized light to a modulator through a third port of the PSR, wherein a polarization mode of the first polarized light is the same as a polarization mode of the second polarized light;
   the polarization rotation structure is configured to: rotate a polarization direction of the first polarized light by 180 degrees to obtain a rotated first polarized light; and send the rotated first polarized light to the modulator; and
   the modulator is configured to modulate the rotated first polarized light to obtain a first signal light; send the first signal light to the third port of the PSR; modulate the second polarized light to obtain a second signal light; and send the second signal light to the polarization rotation structure, wherein:
   the polarization rotation structure is further configured to send the second signal light to the second port of the PSR; and
   the PSR is further configured to: combine the first signal light and the second signal light to obtain an output signal light; and send the output signal light through the first port of the PSR, a polarization direction of the output signal light is perpendicular to a polarization direction of the input signal light.

2. The apparatus according to claim 1, wherein a first optical path from a first end of the modulator to the PSR is equal to a second optical path from a second end of the modulator to the PSR.

3. The apparatus according to claim 1, wherein the polarization rotation structure comprises a phase modulator or a dynamic polarization controller.

4. The apparatus according to claim 3, wherein the polarization rotation structure is further configured to receive the second signal light after the first polarized light leaves the polarization rotation structure.

5. The apparatus according to claim 1, wherein:
   the polarization rotation structure comprises a Faraday crystal and a first polarization rotator (PR);
   the Faraday crystal has two ports and is configured to: rotate, in a first direction by 90 degrees, a polarization direction of a light incident from a first port of the Faraday crystal; and rotate, in a second direction by 90 degrees, a polarization direction of a light incident from a second port of the Faraday crystal, the first direction is a clockwise direction or a counterclockwise direction, and the second direction is opposite to the first direction; and the first PR has two ports and is configured to: rotate, in the first direction by 90 degrees, polarization directions of lights incident from the two ports of the first PR, a first port of the two ports of the first PR is connected to a port of the Faraday crystal.

6. The apparatus according to claim 5, wherein:

the polarization rotation structure further comprises a first polarizer and a second polarizer;

the first polarizer is located between the Faraday crystal and the PSR, and the first polarizer is configured to: limit a polarization direction of a light passing through the first polarizer in a direction that is the same as or opposite to the polarization direction of the first polarized light; and the second polarizer is located:
between the first PR and the modulator, and the second polarizer is configured to limit a polarization direction of light passing through the second polarizer in a direction the same as or opposite to the polarization direction of the first polarized light; or
between the Faraday crystal and the first PR, and the second polarizer is configured to limit a polarization direction of light passing through the second polarizer in a direction perpendicular to the polarization direction of the first polarized light.

7. The apparatus according to claim 5, wherein:

the polarization rotation structure further comprises a first polarizer and a second polarizer;

the first polarizer is located between the Faraday crystal and the modulator, and the first polarizer is configured to limit a polarization direction of light passing through the first polarizer in a direction the same as or opposite to the polarization direction of the first polarized light; and the second polarizer is located:
between the first PR and the PSR, and the second polarizer is configured to limit a polarization direction of light passing through the second polarizer in a direction the same as or opposite to the polarization direction of the first polarized light; or
between the Faraday crystal and the first PR, and is the second polarizer configured to limit a polarization direction of light passing through the second polarizer in a direction perpendicular to the polarization direction of the first polarized light.

8. The apparatus according to claim 5, wherein the PSR, the modulator, and the polarization rotation structure are connected to each other using a polarization maintaining optical fiber.

9. The apparatus according to claim 1, wherein the PSR comprises a polarization beam splitter (PBS) and a second PR, wherein the PBS is configured to: split the input signal light into two polarized lights having polarization directions perpendicular to each other; and combine the two polarized lights having polarization directions perpendicular to each other into the output signal light; and the second PR is located:
between the PBS and the polarization rotation structure; or
between the PBS and the modulator, and the second PR is configured to: rotate, in a first direction by 90 degrees, a polarization direction of a light passing through the second PR, the first direction is a clockwise direction or a counterclockwise direction.

10. An apparatus, comprising:

a polarization splitter rotator (PSR) comprising a first port, a second port, and a third port, the PSR receives an input signal light through the first port, splits the input signal light into a first polarized light and a second polarized light, and sends the first polarized light and the second polarized light to a polarization rotation structure through the second port and the third port respectively, wherein a polarization mode of the first polarized light is the same as a polarization mode of the second polarized light;

the polarization rotation structure is configured to: rotate a polarization direction of the first polarized light by 180 degrees to obtain a rotated first polarized light; send the rotated first polarized light to the third port; and send the second polarized light to the second port of the PSR; and the PSR is further configured to: combine the rotated first polarized light and the second polarized light to obtain an output signal light; and send the output signal light through the first port, wherein a polarization direction of the output signal light is perpendicular to a polarization direction of the input signal light.

11. The apparatus according to claim 10, wherein the polarization rotation structure comprises a phase modulator or a dynamic polarization controller.

12. The apparatus according to claim 11, wherein the polarization rotation structure is further configured to receive the second signal after the first polarized light leaves the polarization rotation structure.

13. The apparatus according to claim 10, wherein the polarization rotation structure comprises a Faraday crystal and a first polarization rotator (PR);

the Faraday crystal has two ports and is configured to: rotate, in a first direction by 90 degrees, a polarization direction of a light incident from a first port of the Faraday crystal; and rotate, in a second direction by 90 degrees, a polarization direction of a light incident from a second port of the Faraday crystal, wherein the first direction is a clockwise direction or a counterclockwise direction, and the second direction is opposite to the first direction; and the first PR has two ports and is configured to rotate, in the first direction by 90 degrees, polarization directions of lights incident from the two ports of the first PR, wherein a first port of the two ports of the first PR is connected to any port of the Faraday crystal.

14. The apparatus according to claim 13, wherein the polarization rotation structure further comprises a first polarizer and a second polarizer;

the first polarizer is located between the Faraday crystal and the PSR, and the first polarizer is configured to limit a polarization direction of light passing through the first polarizer in a direction the same as or opposite to the polarization direction of the first polarized light; and the second polarizer is located:
between the first PR and the PSR, and the second polarizer is configured to limit a polarization direction of light passing through the second polarizer in a direction the same as or opposite to the polarization direction of the first polarized light; or
between the Faraday crystal and the first PR, and is configured to limit a polarization direction of light passing through the second polarizer in a direction perpendicular to the polarization direction of the first polarized light.

15. The apparatus according to claim 10, wherein the PSR and the polarization rotation structure are connected to each other through a polarization maintaining optical fiber.

16. The apparatus according to claim 10, wherein the PSR comprises a polarization beam splitter (PBS) and a second PR, wherein:
the PBS is configured to split the input signal light into two polarized lights having polarization directions perpendicular to each other, and the PBS is further configured to combine the two polarized lights having polarization directions perpendicular to each other into the output signal light; and
the second PR is located between the PBS and the polarization rotation structure, and the second PR is configured to rotate, in a first direction by 90 degrees, a polarization direction of light passing through the second PR, the first direction is a clockwise direction or a counterclockwise direction.

17. A device, comprising:
a quantum light source configured to: emit an optical pulse; and send the optical pulse to an encoding structure;
the encoding structure comprising a beam splitter, an optical reflector, and an encoding apparatus, wherein:
the beam splitter is configured to: receive the optical pulse; split the optical pulse into a first polarized light and a second polarized light; send the first polarized light to the optical reflector; and send the second polarized light to the encoding apparatus, wherein a difference between an first optical path and a second optical path is N, the first optical path is from the beam splitter to the optical reflector, the second optical path is from the beam splitter to the encoding apparatus, and N is a natural number;
the optical reflector comprises a first polarization splitter-rotator (PSR) and a first polarization rotation structure, wherein the first PSR comprises three ports, the first PSR is configured to receive the first polarized light through a first port of the first PSR, split the first polarized light into a first sub-polarized light and a second sub-polarized light, and send the first sub-polarized light and the second sub-polarized light to the first polarization rotation structure through a second port of the first PSR and a third port of the first PSR respectively, wherein a polarization mode of the first sub-polarized light is the same as a polarization mode of the second sub-polarized light, wherein the first polarization rotation structure is configured to: rotate a polarization direction of the first sub-polarized light by 180 degrees to obtain a rotated first sub-polarized light, send the rotated first sub-polarized light to the third port of the first PSR, and send the second sub-polarized light to the second port of the first PSR; and the first PSR is further configured to: combine the rotated first sub-polarized light and the second sub-polarized light to obtain a third polarized light, and send the third polarized light to the beam splitter through the first port of the first PSR, wherein a polarization direction of the third polarized light is perpendicular to a polarization direction of the first polarized light;
the encoding apparatus comprises a second PSR, a second polarization rotation structure, and a modulator, wherein the second PSR comprises three ports, the second PSR is configured to: receives the second polarized light by using a first port of the second PSR, split the second polarized light into a third sub-polarized light and a fourth sub-polarized light, send the third sub-polarized light to the second polarization rotation structure through a second port of the second PSR, and send the fourth sub-polarized light to the modulator through a third port of the second PSR, wherein a polarization mode of the third sub-polarized light is the same as a polarization mode of the fourth sub-polarized light; the second polarization rotation structure is configured to rotate a polarization direction of the third sub-polarized light by 180 degrees to obtain a rotated third sub-polarized light, and send the rotated third sub-polarized light to the modulator; the modulator is configured to modulate the rotated third sub-polarized light to obtain a first signal light, and send the first signal light to the third port of the second PSR, modulate the fourth sub-polarized light to obtain a second signal light, and send the second signal light to the second polarization rotation structure; the second polarization rotation structure is further configured to send the second signal light to the second port of the second PSR; and the second PSR is further configured to combine the first signal light and the second signal light to obtain a fourth polarized light, and send the fourth polarized light to the beam splitter through the first port of the second PSR, wherein a polarization direction of the fourth polarized light is perpendicular to a polarization direction of the second polarized light; and the beam splitter is further configured to send the third polarized light and the fourth polarized light to an attenuator; and
the attenuator is configured to: attenuate the third polarized light and the fourth polarized light to a single-photon level; and send an attenuated third polarized light and an attenuated fourth polarized light through a quantum channel.

18. A device, comprising:
a circulator configured to: receive an attenuated third polarized light and an attenuated fourth polarized light through a quantum channel, and send the attenuated third polarized light and the attenuated fourth polarized light to an encoding structure;
the encoding structure comprising a beam splitter, an optical reflector, and an encoding apparatus, wherein:
the beam splitter is configured to: receive the attenuated third polarized light and the attenuated fourth polarized light, split the attenuated third polarized light into a first sub-polarized light and a second sub-polarized light, split the attenuated fourth polarized light into a third sub-polarized light and a fourth sub-polarized light, send the first sub-polarized light and the third sub-polarized light to the optical reflector, and send the second sub-polarized light and the fourth sub-polarized light to the encoding apparatus, wherein a difference between first optical path and a second optical path is N, the first optical path is from the beam splitter to the optical reflector, the second optical path from the beam splitter to the encoding apparatus, and N is a natural number;
the optical reflector comprises a first polarization splitter-rotator (PSR) and a first polarization rotation structure, wherein the first PSR has three ports, the first PSR is configured to: receive the first sub-polarized light through a first port of the first PSR, split the first sub-polarized light into a fifth sub-polarized light and a sixth sub-polarized light, and send the fifth sub-polarized light and the sixth sub-polarized light to the first polarization rotation structure through a second port of the first PSR and a third port of the first PSR respectively, a polarization mode of the fifth sub-polarized light is the same as a polarization mode of the sixth sub-polarized light; the first polarization rotation structure is configured to: rotate a polarization direction of the fifth sub-polarized light by 180 degrees to obtain a rotated fifth sub-polarized light, send the rotated fifth sub-polarized light to the third port of the first PSR, and send the sixth sub-polarized light to the second port of the first PSR; the first PSR is further configured to: combine the rotated fifth sub-polarized light and the sixth sub-polarized light to obtain a first output polarized light, and send the first output polarized light to the beam splitter through the first port of the first PSR, a polarization direction of the first output polarized light is perpendicular to a polarization direction of the first sub-polarized light; and the optical reflector is configured to perform the same processing on the third sub-polarized light as the first sub-polarized light to obtain a second output polarized light, and sends the second output polarized light to the beam splitter through the first port of the first PSR, wherein a polarization direction of the second output polarized light is perpendicular to a polarization direction of the third sub-polarized light;

the encoding apparatus comprises a second PSR, a second polarization rotation structure, and a modulator, wherein the second PSR has three ports, the second PSR is configured to: receive the second sub-polarized light through a first port of the second PSR, split the second sub-polarized light into a seventh sub-polarized light and an eighth sub-polarized light, send the seventh sub-polarized light to the second polarization rotation structure through a second port of the second PSR, and send the eighth sub-polarized light to the modulator through a third port of the second PSR, a polarization mode of the seventh sub-polarized light is the same as a polarization mode of the eighth sub-polarized light; the second polarization rotation structure is configured to: rotate a polarization direction of the seventh sub-polarized light by 180 degrees to obtain a rotated seventh sub-polarized light, and send the rotated seventh sub-polarized light to the modulator; the modulator is configured to: modulate the rotated seventh sub-polarized light to obtain a first signal light, send the first signal light to the third port of the second PSR, modulate the eighth sub-polarized light to obtain a second signal light, and send the second signal light to the second polarization rotation structure; the second polarization rotation structure is further configured to send the second signal light to the second port of the second PSR; the second PSR is further configured to: combine the first signal light and the second signal light to obtain a third output polarized light, and send the third output polarized light to the beam splitter through the first port of the second PSR, wherein a polarization direction of the third output polarized light is perpendicular to a polarization direction of the second sub-polarized light; and the encoding apparatus is configured to: perform the same processing on the fourth sub-polarized light as the second sub-polarized light to obtain a fourth output polarized light, and send the fourth output polarized light to the beam splitter through the first port of the second PSR, wherein a polarization direction of the fourth output polarized light is perpendicular to the polarization direction of the second sub-polarized light; and the beam splitter is further configured to: make the second output polarized light and the third output polarized light interfere with each other to obtain a first interfered light and a second interfered light, and send the first interfered light and the second interfered light to the circulator and a second single-photon detector respectively;

the circulator is further configured to send the first interfered light to a first single-photon detector; and the first and the second single-photon detectors are each configured to detect the first interfered light and the second interfered light, respectively.

19. A system, comprising:

a laser connected to a second port of a polarization beam splitter (PBS), the laser is configured to emit a first polarized light;

the PBS comprising three ports and is configured to: receive the first polarized light through a second port of the PBS, and send the first polarized light to a remote modulation apparatus through a first port of the PBS through a transmission channel;

the remote modulation apparatus comprises a polarization splitter-rotator (PSR), a polarization rotation structure, and a modulator, wherein:

the PSR comprises three ports and is configured to: receive an input signal light through a first port of the PSR, split the input signal light into a second polarized light and a third polarized light, send the second polarized light to the polarization rotation structure through a second port of the PSR, and send the third polarized light to the modulator through a third port of the PSR, the input signal light is obtained after the first polarized light passes through the transmission channel, and a polarization mode of the second polarized light is the same as a polarization mode of the third polarized light;

the polarization rotation structure is configured to: rotate a polarization direction of the second polarized light by 180 degrees to obtain a rotated second polarized light, and send the rotated second polarized light to the modulator;

the modulator is configured to: modulate the rotated second polarized light to obtain a first signal light, send the first signal light to the third port of the PSR, modulate the third polarized light to obtain a second signal light, and send the second signal light to the polarization rotation structure;

the polarization rotation structure is configured to send the second signal light to the second port of the PSR;

the PSR is further configured to: combine the first signal light and the second signal light to obtain an output signal light, and send the output signal light to the PBS through the first port of the PSR through the transmission channel, a polarization direction of the output signal light is perpendicular to a polarization direction of the input signal light;

the PBS is configured to: receive a fourth polarized light through the first port of the PBS, and send the fourth polarized light to a receiver through a third port of the PBS, the fourth polarized light is obtained after the output signal light passes through the transmission channel; and the receiver is configured to receive the fourth polarized light.

20. The system according to claim 19, further comprising a beam splitter configured to:
receive the first polarized light;
split the first polarized light into a first polarized light and a second polarized light;
send the first polarized light to the PBS; and
send the second polarized light to the receiver.

* * * * *